(12) United States Patent
Machida et al.

(10) Patent No.: US 7,230,604 B2
(45) Date of Patent: Jun. 12, 2007

(54) DISPLAY MEDIUM DRIVING METHOD

(75) Inventors: Yoshinori Machida, Nakai-machi (JP); Kiyoshi Shigehiro, Nakai-machi (JP); Yoshiro Yamaguchi, Nakai-machi (JP); Motohiko Sakamaki, Nakai-machi (JP); Takeshi Matsunaga, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 833 days.

(21) Appl. No.: 09/946,600

(22) Filed: Sep. 6, 2001

(65) Prior Publication Data
US 2002/0033784 A1   Mar. 21, 2002

(30) Foreign Application Priority Data
Sep. 8, 2000    (JP)   ............................ 2000-273833

(51) Int. Cl.
G09G 3/34       (2006.01)
(52) U.S. Cl. .................................................... 345/107
(58) Field of Classification Search .................. 345/95, 345/112, 107, 108, 84; 347/112, 153; 359/296, 359/452; 204/450; 313/493; 346/74.3
See application file for complete search history.

(56) References Cited

U.S. PATENT DOCUMENTS

| | | | |
|---|---|---|---|
| 4,806,443 A | | 2/1989 | Yanus et al. |
| 5,784,091 A | * | 7/1998 | Ema et al. .................. 347/131 |
| 5,959,710 A | * | 9/1999 | Yaniv ......................... 349/155 |
| 6,054,071 A | * | 4/2000 | Mikkelsen, Jr. ............ 264/1.36 |
| 6,072,621 A | * | 6/2000 | Kishi et al. ................. 359/296 |
| 6,122,031 A | * | 9/2000 | Terada et al. ............... 349/155 |
| 6,239,896 B1 | * | 5/2001 | Ikeda ......................... 359/240 |
| 6,323,989 B1 | * | 11/2001 | Jacobson et al. ........... 359/296 |
| 6,445,374 B2 | * | 9/2002 | Albert et al. ............... 345/107 |
| 6,473,063 B1 | * | 10/2002 | Suzuki et al. .............. 345/74.1 |
| 6,486,866 B1 | * | 11/2002 | Kuwahara et al. .......... 345/107 |
| 6,535,197 B1 | * | 3/2003 | Comiskey et al. .......... 345/107 |
| 6,685,982 B2 | * | 2/2004 | Hasegawa ...................... 427/8 |
| 6,710,540 B1 | * | 3/2004 | Albert et al. ............... 313/498 |

FOREIGN PATENT DOCUMENTS

| | | | |
|---|---|---|---|
| JP | 09-185087 | * | 7/1997 |
| JP | 11-161205 | * | 6/1999 |
| JP | 2000-066249 | * | 3/2000 |

OTHER PUBLICATIONS

Jo et al., "New Toner Display Device", Japan Hardcopy '99, pp. 249-252.

* cited by examiner

*Primary Examiner*—Richard Hjerpe
*Assistant Examiner*—Abbas Abdulselam
(74) *Attorney, Agent, or Firm*—Oliff & Berridge, PLC

(57) ABSTRACT

A drive method for a display medium containing two particle types can drive the display medium with a low voltage and thereby achieve high image resolution, downsize the drive circuit, and lower the cost while improving the durability of the display medium. The display medium has a pair of substrates, at least one of which is transparent, disposed with a gap therebetween, and two types of particles of different color and charge characteristics sealed between the pair of substrates. To change the displayed image, the drive method applies a voltage pulse to at least one of the pair of substrates to pull particles that are to move to the substrate to which the particles that are to move adhere, and then applies a voltage pulse to move the particles that are to move to the substrate opposite the substrate to which the particles that are to move adhere.

10 Claims, 16 Drawing Sheets

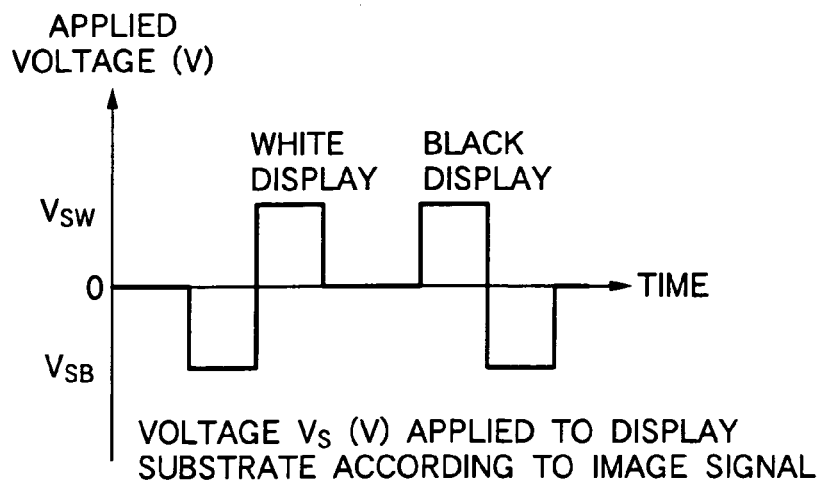
FIG.6A  VOLTAGE $V_S$ (V) APPLIED TO DISPLAY SUBSTRATE ACCORDING TO IMAGE SIGNAL
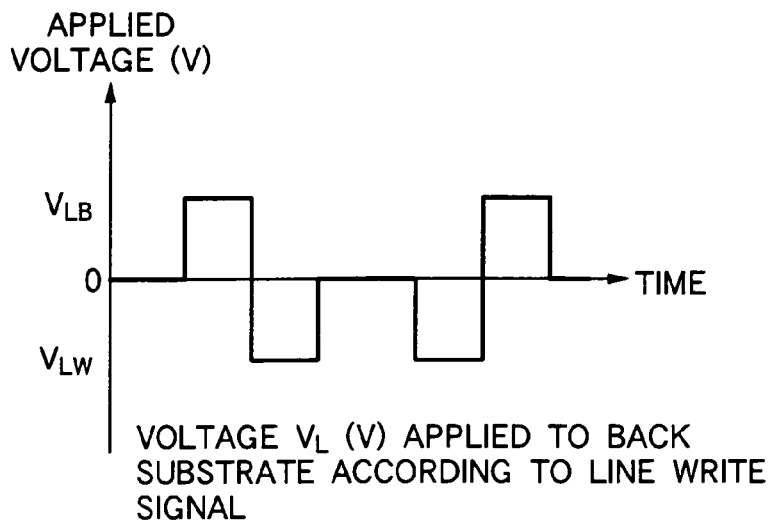
FIG.6B  VOLTAGE $V_L$ (V) APPLIED TO BACK SUBSTRATE ACCORDING TO LINE WRITE SIGNAL
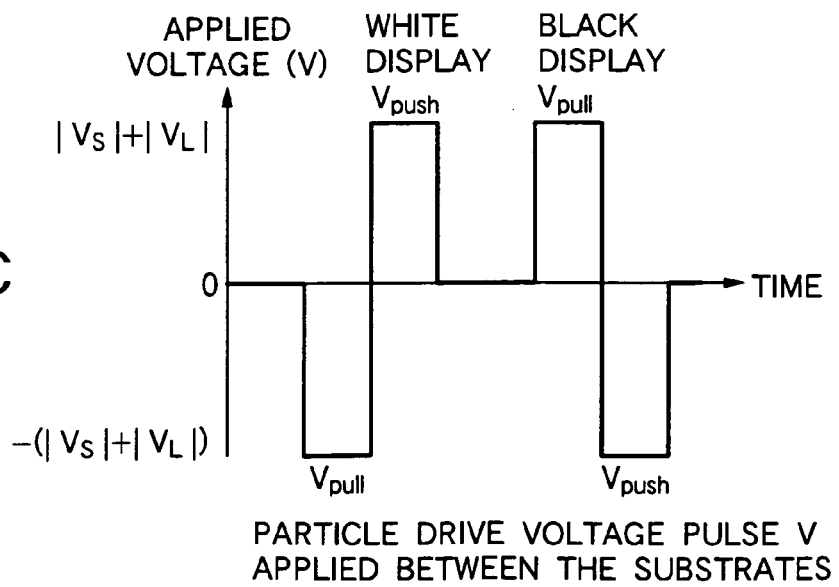
FIG.6C  PARTICLE DRIVE VOLTAGE PULSE V APPLIED BETWEEN THE SUBSTRATES

SOLID LINE: RESULTS OF EMBODIMENT 1
DOTTED LINE: RESULTS OF COMPARISON 1

DISPLAY MEDIUM DRIVING METHOD

BACKGROUND OF THE INVENTION

1. Field of the Invention

The present invention relates to a method for driving a display medium, and relates more particularly to a display medium driving method for applying a voltage pulse to a display medium containing two types of particles of different color and charge characteristics.

2. Description of Related Art

Twisting ball displays (dichroic twisting ball displays), electrophoretic image displays, magnetophoretic image displays, thermal rewritable image displays, and liquid crystals capable of storing an image have been proposed as display media capable of repeating image display.

Of these display media, thermal rewritable image displays and liquid crystals capable of storing an image offer excellent image retention but suffer from low contrast between the image and non-image (background) areas because they cannot present a paper-white background. It is therefore difficult to present a sharp image.

Furthermore, display media using electrophoresis or magnetophoresis have color particles that can be moved by an electrical or magnetic field dispersed in a white fluid medium. Images are formed by making the color particles adhere to the display surface in the image area to display the color of the color particles while removing the color particles from the display surface in the non-image areas to display the white of the white fluid. Furthermore, these types of displays can store an image because the color particles do not move without an electrical or magnetic field being applied. However, while these displays can present a clear white background, sufficient image density cannot be achieved due to the intrusion of the white fluid into the gaps between color particles in the image areas. Sufficient contrast therefore cannot be achieved between the image and non-image areas. A sharp image display therefore cannot be achieved. Furthermore, if the display medium is bent when removed from the image display, there is the possibility of the white fluid leaking from the display medium.

Furthermore, twisting ball displays present an image by applying an electric field to spheric particles (balls), half of each ball being coated white and the other half black, to selectively reverse ball orientation. For example, the balls are driven to present the black side to the surface of the display in the image areas, and present the white side to the display surface in the non-image areas. This type of display can also store an image because the balls do not change orientation unless a field is applied. This type of display medium can also be manufactured in sheets relatively easily because the inside of the display medium contains substantially only solid particles, although oil is present only in the cavities around the particles. However, this display medium cannot present a 100% white display in principle even if a field is applied to the display medium so that the entire display surface shows white because ambient light rays penetrating the gaps between the balls are not reflected and are lost inside the display medium. In addition, light absorption and diffusion by the cavities means that only a gray tinged white display can be achieved. It is also difficult to completely reverse the particles, leading to a drop in contrast and, as a result, making it difficult to present clear images. Moreover, because particle size must be smaller than the pixel size, minute particles coated different colors must be manufactured in order to achieve a high resolution display. This requires sophisticated manufacturing technology.

A medium having a conductive color toner and white particles sealed between a pair of opposing substrates has also been proposed as an image display medium with a white background. With this type of image display medium a charge is injected to the conductive color toner through a charge transport layer disposed on the inside electrode surface of the back substrate, and the charge-injected conductive color toner is moved to and caused to adhere to the inside of the display substrate by applying a field between the electrode panels to display an image (see Japan Hardcopy '99, pp. 249-252). This image display medium consists of only solids, and color of pixels can, in principle, be changed completely. The problem with this type of display medium is that contrast cannot be sufficiently improved because there is conductive color toner not in contact with the charge transport layer displayed to the inside electrode surface of the back substrate, there is also conductive color toner independent of other conductive color toner, and these conductive color toners are found randomly dispersed between the substrates because a charge is not applied thereto and the toner particles therefore are not moved by an electric field.

[Problem to be Solved]

We have proposed (Japanese Patent Application 2000-165138) a display medium having a pair of substrates and plural types of particle groups of different color and charge characteristics sealed between the substrates. This display medium can also store images because the particles do not move unless a field is applied. Fluid leaks also do not occur because the display medium contains only solids. A high contrast, sharp image can also be displayed because a 100% change in color of pixels can, in principle, be achieved.

However, to achieve sufficient image density with this type of display medium by driving the charged color particles with an electric field, it is necessary to apply a high voltage, typically of several hundred volts or more although this varies with the substrate gap. This high voltage requirement produces the following problems.

First, discharge and electric leaks occur easily if the wiring density is high, and it is therefore difficult to achieve a high resolution display. Furthermore, the lack of semiconductor devices suitable for controlling such high voltages means that mechanical relays must be used for electrical switching in the drive circuit. This makes it difficult to reduce circuit size and lower cost. In addition, applying a high drive voltage increases particle velocity when the particles are driven, resulting in particles colliding with each other and with the substrates. This leads to change in the electrical properties of the particles and degradation of the substrate surface, shortening display medium life.

There are both passive matrix and active matrix display medium drive methods. If the display comprises an n pixel by n pixel matrix, an active matrix drive method driving each individual pixel requires (n×n, or n×n×2) signal paths while a passive matrix drive method driving each individual line requires only (n+n) signal paths. Compared with an active matrix drive method, passive matrix drive uses an extremely simple drive circuit and offers the benefit of greatly lowering cost.

Passive matrix drive is further described next. Passive matrix drive is used with a display medium having a display substrate and back substrate, each having formed thereon plural parallel line electrodes at equal intervals. The substrates are assembled so that the electrodes of the two substrates are mutually orthogonal as shown in FIG. 1. Note that for simplicity the display medium in FIG. 1 has a 4×4 passive matrix configuration with four column electrodes (a-d) on the display substrate and four row electrodes (i-iv) on the back substrate. The electrodes of both the display and back substrates are also connected to the power supply with a passive matrix drive. To form an image, all pixels are normally first driven to a uniform color and only the color of the desired pixels is changed. To change the image one line at a time, a voltage is applied sequentially one line at a time to the row electrodes of the back substrate according to a line write signal while synchronously applying a voltage to the desired column electrodes of the display substrate according to a pixel signal.

Consider, for example, changing the color of the pixels at row i columns a and c, row ii columns b and d, and row iii columns a and c, from black to white using passive matrix drive in a display medium containing positively charged black particles and negatively charged white particles with the entire display substrate displaying black (see FIG. 1). In this case voltage $V_{LW}$ is first applied only to row i while synchronously applying voltage $V_{SW}$ to columns a and c, thus changing the color of the pixels at row i column a and row i column c where both voltages are applied from black to white. Next, voltage $V_{LW}$ is applied to only row ii while synchronously applying voltage $V_{SW}$ to columns b and d, thus changing the color of the pixels at row ii column b and row ii column d from black to white. Then voltage $V_{LW}$ is applied to only row iii while synchronously applying voltage $V_{SW}$ to columns a and c, thus changing the color of the pixels at row iii column a and row iii column c from black to white.

The drive field changing a pixel from black to white is thus $(V_{SW}-V_{LW})/d$ where d is the substrate gap. Note that a field of $V_{SW}/d$ or $V_{LW}/d$ is also applied to the pixels that do not change color. It is therefore necessary for the display not to change, that is, for the particles not to move, when $V_{SW}/d$ or $V_{LW}/d$ is applied. At the same time $(V_{SW}-V_{LW})/d$ is preferably as high as possible to achieve high display contrast. $V_{SW}$ is therefore usually set to the voltage at which white particles begin to move (the voltage at which image density begins to change, referred to below as the "particle drive start voltage"), and $V_{LW}$ is set to the voltage reversing the polarity of the particle drive start voltage for white particles.

When color of pixels is changed from white to black with passive matrix drive, $V_{SB}$ is set to the particle drive start voltage of black particles, and $V_{LB}$ is set to the voltage reversing the polarity of the particle drive start voltage for black particles.

To accomplish passive matrix drive as described above, the applied voltage-image density curve of the display medium must rise sharply after the particle drive start voltage is exceeded as shown in FIG. 30, and sufficient density must also be achieved at twice the particle drive start voltage.

However, as also shown in FIG. 8, the particle drive start voltage is low and the change in image density due to the subsequently applied voltage is gradual with the above display medium, and the desired image density cannot be achieved without a high voltage. Sufficient image density therefore is not achieved at twice the particle drive start voltage, and passive matrix drive cannot display images with sufficient contrast.

The present invention was conceived with consideration for the aforementioned problems, and provides a drive method for a display medium containing two types of particles whereby driving at a low voltage is possible and, as a result, high image resolution, drive circuit downsizing, low display cost, and improved display durability can be achieved.

Our invention also provides a drive method for a display medium containing two types of particles whereby high contrast can be achieved with passive matrix drive, and significant cost reduction in the drive circuit can be achieved.

SUMMARY OF THE INVENTION

The present invention has been made in view of the above circumstances and provides a drive method for a display medium having a pair of substrates, at least one of which is transparent, disposed with a gap therebetween, and two types of particles of different color and charge characteristics sealed between the pair of substrates. The display medium drive method has steps of: applying a voltage pulse to at least one of the pair of substrates to pull particles that are to move to the substrate to which the particles that are to move adhere; and applying next a voltage pulse to move the particles that are to move to the substrate opposite the substrate to which the particles that are to move adhere, thereby changing a displayed image.

Compared with a conventional method that applies a voltage pulse to the pair of substrates only once to move the particles that are to move to the substrate opposite the substrate to which the particles that are to move adhere, the drive method of this invention achieves a higher image density at the same drive voltage. In other words, the method of this invention can reduce the absolute value of the drive voltage needed to achieve the same image density as a conventional method.

How the drive method of this invention can, in comparison with the conventional drive method, improve contrast when the same voltage is applied and lower the absolute value of the drive voltage needed to achieve the same contrast, is still not completely clear, but can probably be explained as follows. By applying a field to the substrates to pull the particles that are to move to the substrate to which they adhere before applying between the substrates a field to move the particles that are to move to the substrate opposite the substrate to which those particles adhere, there is a further accumulation of particles on the substrate. The particle density on the substrate thus increases, electrical repulsion between charged particles of the same polarity increases, and when a field is applied to move these particles to the opposite substrate, this repulsion makes it easier for the particles to move. In addition, the change in the field when particles are moved to the opposite substrate is increased, compared with the conventional drive method, by an amount corresponding to the field first applied to move particles in the opposite [pulling] direction.

The drive method of this invention can be applied with active matrix drive or passive matrix drive.

The total voltage pulse apply time in the cycle applying a voltage pulse to at least one of the pair of substrates to pull particles that are to move to the substrate to which the particles that are to move adhere, and then applying a voltage pulse to move the particles that are to move to the substrate opposite the substrate to which the particles that are to move adhere, is preferably 0.1 msec to 40 msec.

If the apply time is short, it is difficult for the particles to move unless the absolute value of the applied voltage is sufficiently high. The absolute value of the particle drive start voltage can therefore be increased. This produces a sharper applied voltage-image density curve, and makes it possible to increase image contrast even when the present invention is applied to passive matrix drive.

Yet further preferably, this cycle is accomplished two or more times. Compared with applying this cycle only once, repeating the cycle makes it possible to achieve even higher image density at the same applied voltage, or conversely to achieve the same image density at a drive voltage with a lower absolute value. Furthermore, by repeating a 0.1 msec to 40 msec cycle plural times, an applied voltage-image density curve with an even sharper slope can be achieved while maintaining a high particle drive start voltage. The method of this invention can therefore be applied to passive matrix drive and provide high contrast comparable to that achieved with active matrix drive.

The present invention also provides a drive method for a display medium having a transparent display substrate, a back substrate opposite the display substrate with a gap therebetween, and two types of particles of different color and charge characteristics sealed between the display substrate and back substrate. This drive method has steps of applying a voltage pulse to the display substrate and back substrate to move particles adhering to the back substrate to the display substrate side when changing a displayed image; and then applying a voltage pulse to move to the back substrate particles that moved for pixels other than pixels for which particles should move.

This method can be applied to passive matrix drive. This drive method pulls particles of the pixels that need not be changed in display and tend to move even though the absolute value of the applied voltage is small back to the substrate to which they adhere. As a result, there is no change in the apparent pixel density, and the absolute value of the apparent particle drive start voltage can be increased. A sharp apparent slope can therefore be achieved in the applied voltage—image density curve, and contrast can be increased.

Preferably in this method the cycle for applying a voltage pulse to the display substrate and back substrate to move particles adhering to the back substrate to the display substrate side, and then applying a voltage pulse to move to the back substrate particles that moved for pixels other than pixels for which particles should move, is accomplished two or more times.

An even sharper apparent slope can therefore be achieved in the applied voltage—image density curve, and image contrast can be further improved, while maintaining the particle drive start voltage.

The invention further provides a drive method for a display medium comprising a pair of substrates, at least one of which is transparent, disposed with a gap therebetween, and two types of particles of different color and charge characteristics sealed between the pair of substrates. This drive method has a step of applying a voltage pulse gradually increasing from a start voltage to a peak voltage to at least one of the pair of substrates.

With this drive method the drive voltage gradually rises to a peak maximum voltage. There is, therefore, no sharp change in the field when changing the picture, and unnecessary particle movement is suppressed. As a result, the absolute value of the particle drive start voltage can be increased and image contrast can be increased. This drive method is therefore particularly suited to passive matrix drive.

Yet further preferably the voltage pulse is applied two or more times. An even sharper applied voltage—image density curve can therefore be achieved, and image contrast can be further improved, while maintaining the particle drive start voltage.

The invention further provides a drive method for a display medium having a pair of substrates, at least one of which is transparent, disposed with a gap therebetween, and two types of particles of different color and charge characteristics sealed between the pair of substrates. This method has a step of applying a rectangular wave voltage pulse with a pulse width of 0.1 msec to 20 msec to at least one of the pair of substrates two or more times.

If the pulse width (the apply time of one pulse) of the rectangular wave voltage pulse is too short, the absolute value of the particle drive start voltage can be increased, but image density drops and good contrast cannot be achieved. However, image contrast can be improved by repeatedly applying such short pulses. This drive method can be used with active matrix drive or passive matrix drive.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIGS. 6A to 6C show the voltage pulse ($V_S$) applied to the display substrate, voltage pulse ($V_L$) applied to the back substrate, and particle drive voltage pulse (V) [(voltage pulse applied to display substrate)−(voltage pulse applied to back substrate)] applied between the substrates by these voltage pulses in order to change the color of pixels in a display medium, which contains positively charged black particles and negatively charged white particle with the display substrate set to display solid black, from black to white and then white to black using passive matrix drive to which the method of a first preferred embodiment of the invention is applied;

DESCRIPTION OF THE PREFERRED EMBODIMENTS

Figure 1:
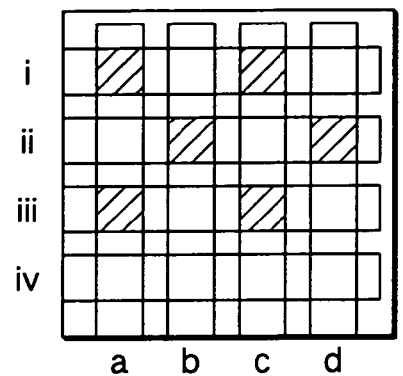
FIG. 1 shows the electrode arrangement of a display medium for passive matrix drive.

The preferred embodiments of the present invention are described below with reference to the accompanying figures.

A display medium used in a preferred embodiment of the present invention has a pair of mutually opposed substrates, at least one of which is transparent, with a gap therebetween, and two types of particles of different color and charge characteristics sealed between the pair of substrates.

The substrate generally consists of a support frame and electrodes. The support frame may be glass or plastic such as polycarbonate resin, acrylic resin, polyimide resin, polyester resin, or epoxy resin. The electrodes may be an oxide of indium, tin, cadmium, or antimony, for example; an oxide compound such as ITO; gold, silver, copper, nickel, or other metal; or an organic conductive material such as polypyrol and polythiophene. These materials can be used as a single layer film, a mixed film, or a composite film, and the substrate can be formed by vapor deposition, sputtering, coating, or other method. Layer thickness is normally 100 to 2000 angstroms using vapor deposition or sputtering techniques. The electrodes can be formed to a desired pattern, such as a matrix, by etching a printed circuit board or liquid crystal display element, or other known technique.

The electrodes could alternatively be embedded in the support frame. In this case the support frame material also functions as the dielectric layer, further described below, and affects the charge properties and fluid properties of the particles, and must therefore be appropriately selected according to the particle composition, for example.

The electrodes can also be separated from the substrate and disposed externally to the display medium. In this case the display medium is disposed between electrodes, and the electrode gap thus increases and the field strength decreases. It is therefore necessary to take measures to, for example, reduce display medium substrate thickness or reduce the substrate gap so that the desired field strength can be achieved.

If the electrodes are formed on the support frame, a dielectric film can be formed over the electrodes as may be necessary to prevent leaks between electrodes, which can invite electrode damage and particle cohesion. The dielectric film can be made from polycarbonate, polyester, polystyrene, polyimide, epoxy, polyisocyanate, polyamide, polyvinyl alcohol, polybutadiene, polymethylmethacrylate, copolymers of nylon, UV-setting acrylic resin, fluororesin, or other suitable material. In addition to the above-cited dielectric materials, materials containing a charge carrier in the dielectric material can also be used. Including a charge carrier in the dielectric material makes it possible to improve particle charging through charge injection to the particle, and stabilizes the particle charge by leaking the particle charge when the particle charge becomes excessively great. Charge carriers include, for example, hydrazone compounds (which are hole carriers), stilbene compounds, pyrazoline compounds, and allylamine compounds. In addition, fluorenone compounds, which are charger carriers, diphenoquinone derivatives, pyrane compounds, and zinc oxide. Free-standing resins with charge carrier properties can also be used. More specifically, these include polyvinyl carbazole, and polycarbonate obtained by polymerizing dihydroxy arylamine and bis-chloroformate as taught in U.S. Pat. No. 4,806,443. The dielectric film is appropriately selected according to the composition of the particles because it can also affect the mobility and charge characteristics of the particles. It should also be noted that the display substrate which is one of the substrate must be able to pass light, and therefore is preferably made using the above materials that are transparent.

Spacers are also disposed between the substrates. The spacers are made from a dielectric material, and more specifically can be made using thermoplastic resins, thermosetting resins, e-beam cured resins, photosetting resins, or various elastomers.

The two types of particles of different color and charge characteristics used in the invention can be selected from among the following: glass beads, dielectric metal oxide particles such as alumina and titanium oxide, thermoplastic or thermosetting resin particles, resin particles having a dye or a pigment fixed on the particle surface, and particles containing a dye or a pigment in the thermoplastic or thermosetting resin.

Thermoplastic resins used to manufacture the particles include the following: styrene compounds such as styrene and chlorostyrene; monoolefins including ethylene, propylene, butylene, and isoprene; vinyl esters such as vinyl acetate, vinyl propyonate, vinyl benzoate, and vinyl butyrate;? α-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ether compounds, including vinyl methyl ether, vinyl ethyl ether, and vinyl butyl ether; and monopolymers or copolymers of vinyl ketone, including vinyl methyl ketone, vinyl hexyl ketone, and vinyl isopropenyl ketone.

Thermosetting resins that can be used to manufacture the particles include the following: crosslinked resin such as crosslinked polymethylmethacrylate and crosslinked copolymers with divinylbenzene as a main constituent; phenol resin, urea resin, melamine resin, polyester resin, and silicone resin.

Typical binder resins include: polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, polyester, polyurethane, epoxy resin, silicone resin, polyamide, modified rosin, and paraffin wax.

Coloring agents include: organic or inorganic pigments and oil-soluble dyes; magnetic powders such as magnetite and ferrite; carbon black; titanium oxide; magnesium oxide; zinc oxide; cyan dyes of copper phthalocyanine; yellow azoic dyes; azoic magenta dyes; quinacridone magenta dyes; and other known red, green, and blue dyes. More specifically, these include aniline blue, chalcocylblue, chrome yellow, ultramarine blue, Dupont Oil Red, quinoline yellow, methylene blue chloride, phthalocyanine blue, malachite green oxalate, lamp black, Rose Bengal, CI Pigment Red 48:1, CI Pigment Red 122, CI Pigment Red 57:1, CI Pigment Yellow 97, CI Pigment Blue 15:1, and CI Pigment Blue 15:3. Porous spongy particles holding air inside and hollow particles can be used for white particles. These are selected so that the tone of the two different particles is different.

While particle shape is not specifically limited, spheric particle shape preferably assures low physical cohesion between the particle and substrate and good particle mobility. Spheric particles can be formed using, for example, suspension polymerization (pearl polymerization), emulsion polymerization, or dispersion polymerization.

The primary particles are generally 1 to 1000 μm, and preferably 5 to 50 μm, but shall not be so limited. The particle diameter of the two different particles is preferably the same in order to achieve high contrast. This avoids large particles being surrounded by small particles, and the resultant drop in color density of the large particles.

A coating agent can be applied to the particle surface as necessary. The color of this coating is preferably white or transparent so as to not affect particle color.

Inorganic microparticles of such metal oxides as silicon oxide (silica), titanium oxide, and alumina can be used for the coating. The microparticles are preferably surface treated with a coupling agent or silicone oil to adjust microparticle charge characteristics, mobility, and environmental dependence.

Coupling agents include aminosilane, amino titanium, nitrile, and other positively charged coupling agents, and silane, titanium, epoxy silane, acrylic silane, and other negatively charged coupling agents not containing nitrogen atoms (that is, consisting of elements not including nitrogen).

Silicone oils include positive charge silicone oils such as amino-modified silicone oil, and negative charge silicones such as dimethyl silicone oil, alkyl modified silicone oil, α-methylsulfone-modified silicone oil, methyl phenyl silicone oil, chlorophenyl-silicone oil, and fluorine modified silicone oil. These materials are selected according to the desired resistance of the coating.

Of these possible materials, the coating is preferably a hydrophobic silica or hydrophobic titanium oxide, and yet further preferably is a titanium compound obtained by reacting $TiO(OH)_2$ with a silane compound such as a silane coupling agent as described in Japanese Patent Laid-Open No. 3177/1998. The silane compound can be any of the following types: chlorosilane, alkoxysilane, silazane, or other special silylation agent. This titanium compound is produced by reacting $TiO(OH)_2$, which is manufactured in a wet process, with a silane compound or silicone oil, and then drying. Because a sintering process of several hundred degrees is not passed, a strong bond between Ti atoms is not formed, there is no agglomeration, and the microparticles are substantially primary particles. Furthermore, because the silane compound or silicone oil is directly reacted with $TiO(OH)_2$, the silane compound or silicone oil process volume can be increased, and the charge characteristics can be controlled and the imparted charge capacity can be significantly improved compared with a conventional titanium oxide by adjusting the amount of silane compound used for the reaction.

The primary particles of the outside coating are generally 5 to 100 nm and preferably 10 to 50 nm, but the invention shall not be so limited.

The ratio of outside coating to particles is adjusted appropriately to the particle diameter and the diameter of the outside coating agent. If too much outside coating agent is used, part of the outside coating agent will separate from the particle surface, adhere to the surface of other particles, and thus prevent achieving the desired charge characteristics. In general, the coating agent is preferably 0.01 to 3, and yet further preferably 0.05 to 1 parts by weight to 100 parts by weight of particles.

It is also necessary to control the composition of the combined particles, the particle mixture ratio, presence (use) of a coating agent, and the composition of the coating agent in order to achieve the desired charge characteristics.

The coating agent can be added to only one of the two different particle types, or to both types of particles. If added to both particle types, it is further preferable to use coating agents of different polarity. Furthermore, if a coating agent is added to the surface of both particle types, it is preferable to strongly fix the coating agent to the particle surface by implanting the coating agent with impact force or heating the particle surface. This prevents the coating agent from separating from the particles, strongly agglomerating with coating agent of different polarity and forming coating agent aggregates that are difficult to dissociate by applying an electric field, and thus prevents image quality deterioration.

Contrast depends on the particle mixture as well as the diameters of the two particle types. To achieve high contrast, the mixture ratio of the two particles is preferably controlled so that the total surface area of the two particle types is substantially equal. If there is much deviation from this ratio, the color of the particles with the greater surface area will be emphasized. Note, however, that this does not necessarily apply if the colors of the two particles are different shades (such as dark and light) of the same color, or if the color obtained by blending two different particles is used in an image.

Figure 2:
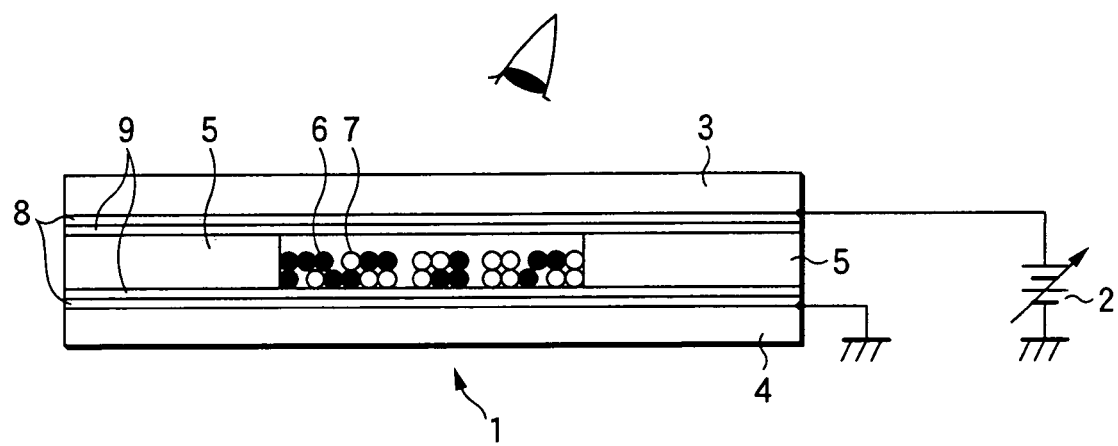
FIG. 2 is a schematic view in section of a display medium according to a preferred embodiment of the present invention.

A display medium configured as described above is shown in FIG. 2. Display medium 1 comprises a transparent display substrate 3, a back substrate 4 opposite the display substrate 3 with a small gap therebetween, a spacer 5 disposed between the display substrate 3 and back substrate 4, and first particles 6 and second particles 7 of different color and charge characteristics. The first particle 6 and second particle 7 are sealed in the space formed between display substrate 3, back substrate 4, and spacer 5.

Figure 3:
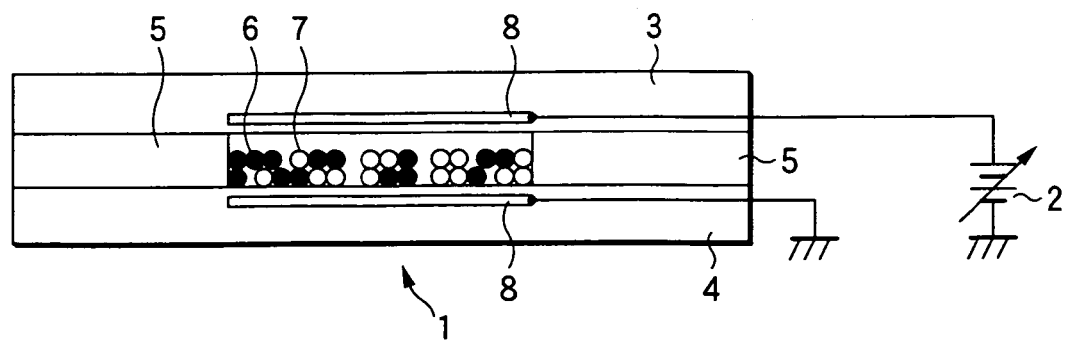
FIG. 3 is a schematic view in section of a display medium according to another preferred embodiment of the present invention.
Figure 4:
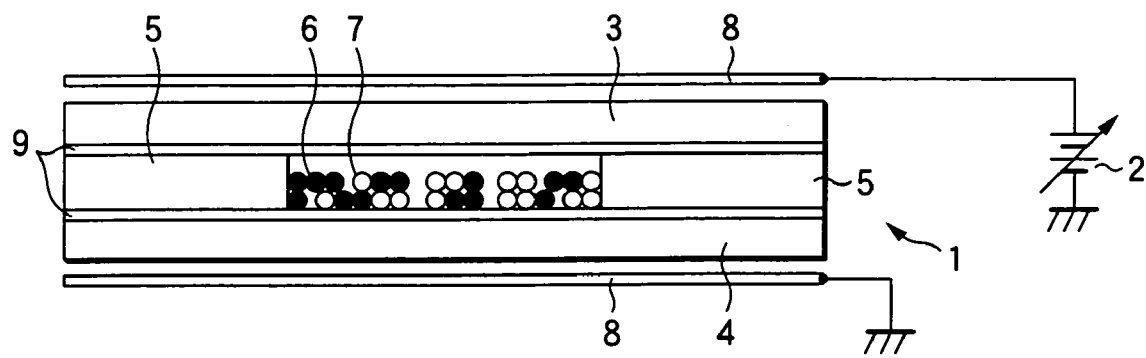
FIG. 4 is a schematic view in section of a display medium according to yet a further preferred embodiment of the present invention.

An electrode 8 is formed on display substrate 3 and back substrate 4, and a dielectric layer 9 is formed over electrode 8. At least the electrode 8 and dielectric layer 9 on display substrate 3 are transparent. The electrode 8 of display substrate 3 in this display medium 1 is connected to a voltage apply unit 2, and the electrode of the back substrate 4 is grounded. Alternatively, both electrodes are connected to the voltage apply unit 2. Further alternatively, the display medium 1 could have the electrode 8 buried in the support frame as shown in FIG. 3, or disposed externally to the display medium 1 as shown in FIG. 4.

The drive method of a first embodiment of this invention operates as follows to change an image after forming one image on the display medium. That is, a voltage pulse is applied to at least one of the substrates in the pair of substrates so that particles to be moved are pulled to the substrate to which the particles to be moved adhere, and then applies a voltage pulse to move the particles to be moved to the substrate opposite that to which the particles to be moved adhere.

It should be noted that the waveform of this voltage pulse is a rectangular wave in this embodiment of the invention, but the invention shall not be so limited. In addition, these voltage pulses are applied continuously.

When passive matrix drive is used, the total voltage pulse apply time is preferably 40 msec or less, and 0.1 msec or greater. If the total voltage pulse apply time is less than 0.1 msec, the display cannot be changed; if greater than 40 msec, the absolute value of the particle drive start voltage cannot be made sufficiently great. The ratio between the apply time of the voltage pulse attracting the particles that are to move to the substrate to which they adhere, and the apply time of the voltage pulse required to move these particles to the substrate opposing the substrate to which they adhere, will vary according to the time of each but is generally preferably 10:1 to 1:10.

Repeating the above voltage pulse apply cycle twice or more is further preferable in the above method to achieve good image density. A drop in density when the particles to move are black, and an increase in density when the particles to move are white, tend to occur easily when the total voltage pulse apply time in one cycle is 0.1 to 40 msec, and it is particularly preferable to repeat the cycle in order to prevent this. Note that the cycles can repeat continuously or with a break between cycles. It is also possible to change the voltage pulse and the apply time in each cycle.

When the drive method of this first embodiment is applied to active matrix drive, these voltage pulses can be applied to only one of the substrates or to both. The absolute value of the voltage $V_{pull}$ [(display substrate voltage)−(back substrate voltage)] acting on both substrates by applying a voltage pulse to pull the particles to be moved to the substrate to which they adhere, and the absolute value of the voltage $V_{push}$ [(display substrate voltage)−(back substrate voltage)] acting on both substrates by applying a voltage pulse to move the particles to be moved to the substrate opposite the substrate to which they adhere, can be the same or different values, but are greater than or equal to the absolute value of the higher particle drive start voltage of the two particle types, are normally less than or equal to the absolute value of the higher voltage of the two particle types at which the image density is saturated in the applied voltage-image density curve, and are selected to attain the desired contrast.

For example, positively charged particles can be moved from the display substrate to the back substrate, that is, negatively charged particles can be moved from the back substrate to the display substrate, by applying a −200V voltage pulse to the display substrate when the back substrate is 0 V, and then applying a +200V voltage pulse to the display substrate, or by applying a voltage pulse of $-V_a$ volts (where $V_a$ is positive) to the display substrate while at the same time applying a voltage pulse of $+(200-V_a)$ volts to the back substrate, and then applying a $+V_b$ volt (where $V_b$ is positive) pulse to the display substrate while applying a $-(200-V_b)$ volt pulse to the back substrate. In either case, however, [(display substrate voltage)−(back substrate voltage)] is first −200V and then +200V.

Figure 5:
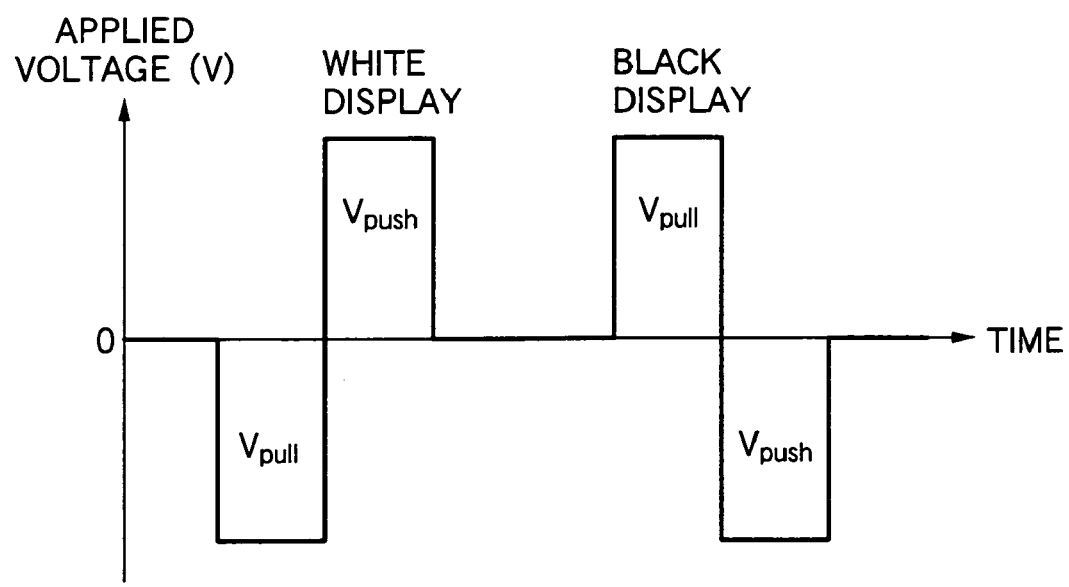
FIG. 5 shows an example of a particle drive voltage pulse [(voltage pulse applied to display substrate)−(voltage pulse applied to back substrate)] applied to both substrates in order to change the color of pixels in a display medium, which contains positively charged black particles and negatively charged white particle with the display substrate set to display solid black, from black to white and then white to black using active matrix drive to which the method of a first preferred embodiment of the invention is applied.

FIG. 5 shows an example of the particle drive voltage pulse [(voltage pulse applied to display substrate)−(voltage pulse applied to back substrate)] applied to both substrates in order to change the pixel color of a display medium containing positively charged black particles and negatively charged white particles. In this case the entire display substrate is initially set to black, and active matrix drive applying the method of this invention is used to change the display from black to white and then white to black.

With passive matrix drive, the electrodes of both substrates are connected to the power supply, and as noted above all pixels are first set to the same color (initialized) before image formation. To then change the color of selected pixels, the drive method of the above first embodiment is applied. More specifically, a voltage pulse that is less than or equal to the absolute value of the particle drive start voltage of the particles adhering to the back substrate and has the same sign as the sign of the particle drive start voltage for these particles is applied to desired row electrodes of the back substrate. Simultaneously thereto a voltage pulse of which the polarity is the inverse of the voltage pulse polarity applied to the row electrode is applied to the desired column electrodes of the display substrate. The voltage pulses are controlled so that the difference of the voltage applied to the back substrate minus the voltage applied to the display substrate is greater than or equal to the particle drive start voltage of the particles adhering to the back substrate. Note that normally a voltage pulse equal to the particle drive start voltage of particles adhering to the back substrate is applied to the line electrode, and the polarity of the voltage pulse applied to the column electrodes is the inverse of this particle drive start voltage polarity. Next, a voltage pulse less than or equal to the absolute value of this particle drive start voltage and opposite in polarity to this particle drive start voltage is applied to the line electrodes of the back substrate, and a voltage pulse with polarity opposite the row electrode voltage pulse is simultaneously applied to the desired column electrodes of the display substrate, so that the difference of the voltage applied to the display substrate minus the voltage applied to the back substrate is greater than or equal to the particle drive start voltage of particles adhering to the back substrate. Note that normally a voltage pulse equal to the particle drive start voltage of particles adhering to the back substrate is applied to column electrodes, and a voltage pulse of opposite polarity is applied to the row electrodes.

FIGS. 6A to 6C show voltage pulse $V_S$ applied to the display substrate, voltage pulse $V_L$ applied to the back substrate, and particle drive voltage pulse V [(voltage pulse applied to display substrate)−(voltage pulse applied to back substrate)] applied between the substrates as a result of these voltage pulses, when passive matrix drive using the method of this first embodiment of the invention is used to change pixel color from black to white and then from white to black in a display medium containing positively charged black particles and negatively charged white particles with the display substrate initially displaying solid black.

A drive method according to a second embodiment of this invention is described next below. When an image is formed on the display medium and the image is then changed by this second embodiment of a drive method of the invention, a voltage pulse is applied to the display substrate and back substrate to move the particles adhering to the back substrate to the display substrate side, and a voltage pulse is then applied to move to the back substrate the particles that moved for pixels other than the pixels of which the particles were to move.

More specifically, using this method of the second embodiment of the invention to change the color of desired pixels after initialization when the electrodes of both the display substrate and back substrate are connected to the power supply, a voltage pulse that is less than or equal to the absolute value of the particle drive start voltage of particles adhering to the back substrate, and is opposite in sign to this particle drive start voltage, is applied to the selected row electrodes of the back substrate. Simultaneously thereto a voltage pulse of polarity opposite this row electrode voltage pulse is applied to the desired column electrodes of the display substrate, and the difference between the voltage applied to the display substrate minus the voltage applied to he back substrate is greater than or equal to the particle drive start voltage of particles adhering to the back substrate. The voltage pulse applied to the column electrodes is normally equal to the particle drive start voltage of particles adhering to the back substrate, and a voltage pulse of opposite polarity to this particle drive start voltage is applied to the row electrodes. Next, a voltage pulse equal to this particle drive start voltage is applied to the row electrodes of the back substrate, and separately thereto (that is, unsynchronized) a voltage pulse of opposite polarity to this row electrode voltage is applied to the desired display substrate column electrodes.

Furthermore, apply time $t_{push}$, which is the apply time of the voltage pulse for moving particles adhering to the back substrate to the display substrate, and the apply times (both time $t_{Spull}$ that a voltage pulse opposite in polarity to the particle drive start voltage of particles moved from the back substrate to the display substrate is applied to the column electrodes, and time $t_{Lpull}$ that a voltage pulse equal to this particle drive start voltage is applied to the row electrodes) of the voltage pulses for moving to the back substrate particles that moved to the display substrate for pixels other than the pixels for which particles were to move, are each preferably 0.1 to 40 msec, and can be the same or different values. Note, further, that $t_{push}$, $t_{Spull}$, and $t_{Lpull}$ can be the same or different values.

Furthermore, it should be noted that the waveforms of these voltage pulse are rectangular waves in this embodiment of the invention, but the invention shall not be so limited. In addition, these voltage pulses can be applied continuously or intermittently.

Figure 7A:
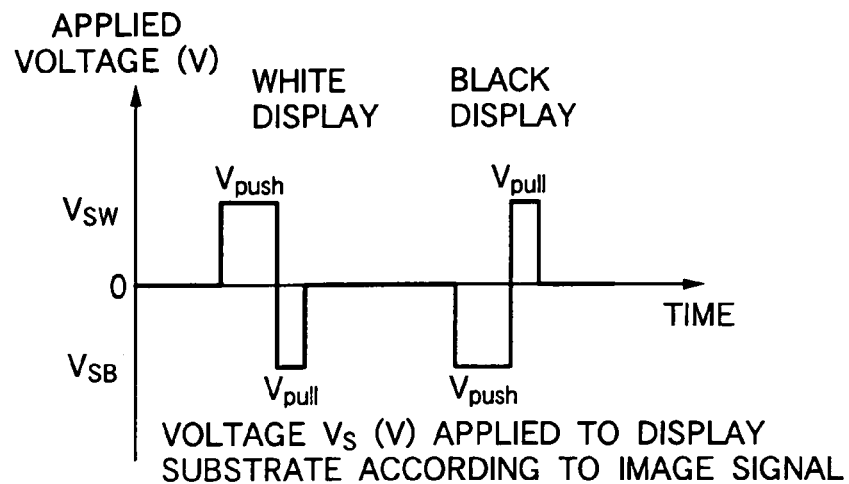
FIGS. 7A to 7C show the voltage pulse ($V_S$) applied to the display substrate, voltage pulse ($V_L$) applied to the back substrate, and particle drive voltage pulse (V) [(voltage pulse applied to display substrate)−(voltage pulse applied to back substrate)] applied between the substrates by these voltage pulses in order to change the color of pixels in a display medium, which contains positively charged black particles and negatively charged white particle with the display substrate set to display solid black, from black to white and then white to black using passive matrix drive to which the method of a second preferred embodiment of the invention is applied.
Figure 7B:
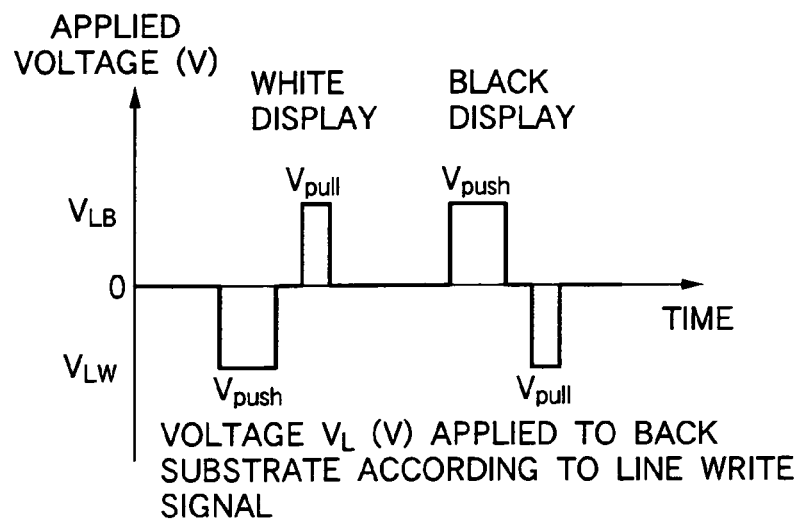
Figure 7C:
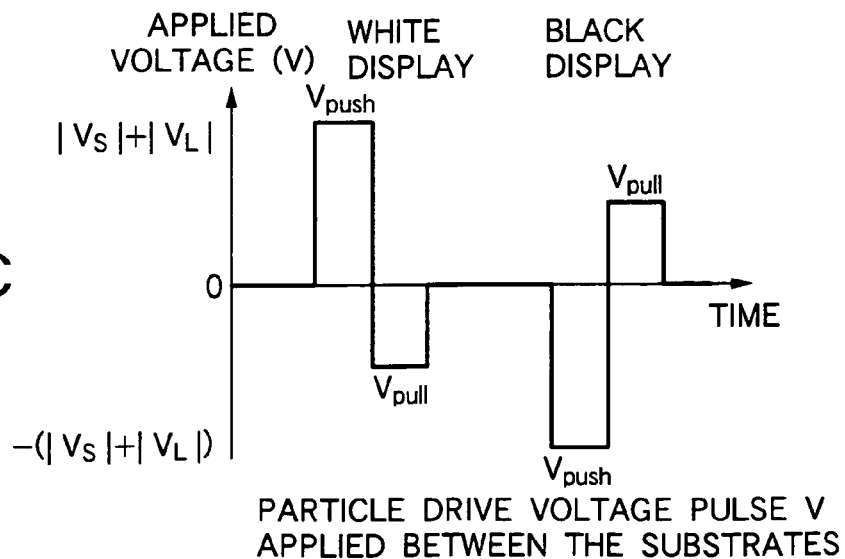

FIGS. 7A to 7C show voltage pulse $V_S$ applied to the display substrate, voltage pulse $V_L$ applied to the back substrate, and particle drive voltage pulse V [(voltage pulse applied to display substrate)−(voltage pulse applied to back substrate)] applied between the substrates as a result of these voltage pulses, when the method of the second embodiment of the invention is used to change pixel color from black to white and then from white to black in a display medium containing positively charged black particles and negatively charged white particles with the display substrate initially displaying solid black.

In the drive method according to this second embodiment, a drive cycle consisting of applying each of these voltage pulses is preferably repeated two or more times in order to achieve good image density. Note that the cycles can repeat continuously or with a break between cycles. It is also possible to change the voltage pulse and the apply time in each cycle.

With the drive method according to a third embodiment of this invention a voltage pulse that gradually increases from a start voltage to a peak voltage is applied to at least one of the pair of substrates in order to form an image. It should be noted that the last value of one pulse does not have to be the peak voltage.

This type of voltage pulse can be achieved using a triangular wave, sawtooth wave, sine wave, or stepped pulse wave.

The drive method of this third embodiment of the invention is preferably applied as noted above with passive matrix drive. In this case the voltage pulse is first applied to both substrates for initialization. The voltage pulse then applied to the line electrodes of the back substrate is set so that the absolute value of the peak voltage is less than or equal to that of the particle drive start voltage of particles adhering to the back substrate, and the pulse sign is opposite the sign of this particle drive start voltage. The voltage pulse applied to the display substrate column electrodes is the opposite polarity of the voltage pulse applied to the row electrodes. The difference of the peak voltage of the voltage pulse applied to the column electrodes minus the peak voltage of the voltage pulse applied to the row electrodes is greater than or equal to the particle drive start voltage of particles adhering to the back substrate.

In addition, the pulse apply time is preferably 1 to 100 msec, and further preferably 1 to 40 msec, although the precise pulse apply time will vary according to the peak voltage and desired contrast.

Moreover, this voltage pulse is preferably applied two or more times, and further preferably three or more times although this depends on the desired contrast. In this case the voltage pulses can be applied continuously or intermittently. Furthermore, the peak voltage and apply times of the voltage pulses can be the same or different.

With a drive method according to a fourth embodiment of the invention, a rectangular wave voltage pulse with a pulse width of 0.1 to 20 msec is applied two or more times to at least one substrate of the pair of substrates in order to form an image.

If the pulse width is less than 0.1 msec, it is not possible to form an image or change the image display, and if the pulse width exceeds 20 msec, the particle drive start voltage rises.

Furthermore, good image density cannot be achieved if the voltage pulse is applied only once. The pulse count will depend on the desired contrast, but is preferably three or more.

Applying the drive method of this fourth embodiment of the invention to active matrix drive is described next. In this case the absolute value of the voltage applied between the substrates is greater than or equal to the absolute value of the higher particle drive start voltage of the two particle types, is normally less than or equal to the absolute value of the higher voltage of the two particle types at which the image density is saturated in the applied voltage—image density curve, and is selected to attain the desired contrast. Furthermore, the voltage pulse can be applied to one substrate or to both.

Moreover, when this drive method of the fourth embodiment is applied to passive matrix drive, the voltage pulse is applied to both substrates for initialization. Then, a voltage pulse of which the absolute value is less than or equal to the absolute value of the particle drive start voltage of particles adhering to the back substrate, and the polarity is opposite the polarity of this particle drive start voltage, is applied to the line electrodes of the back substrate. A voltage pulse of which the absolute voltage is less than or equal to the absolute value of this particle drive start voltage and the polarity is opposite is applied to the display substrate column electrodes. The difference of the voltage applied to the display substrate minus the voltage applied to the back substrate is greater than or equal to the particle drive start voltage of particles adhering to the back substrate.

Embodiments

The preferred embodiments of the present invention are described next below. It should be noted that unless otherwise stated "parts" as used below refers to "parts by weight."

Comparison 1

Ilmenite is dissolved in sulfuric acid, the iron is then separated, and water is added to the resulting $TiOSO_4$ to produce $TiO(OH)_2$ by hydrolysis. Next, 100 parts $TiO(OH)_2$ dispersed in 500 $cm^3$ water adjusted by the above method are mixed at room temperature, and to this is dripped 50 parts isopropyltrimethoxysilane. Next, the microparticles in the resulting mixture are filtered and repeatedly washed in water. The resulting titanium compound surface treated with isopropyltrimethoxysilane is then dried at 150 deg C. and pulverized for 2 minutes using a sample mill to obtain the coating agent with an average primary particle diameter of 30 nm.

Next, 0.4 part of this coating agent is added to 100 parts of particles, obtained by grading spheric particles of crosslinked polymethylmethacrylate containing titanium oxide (Techpolymer MBX-20-WHITE, Sekisui Plastics Co.), with a volume average diameter of 20 μm and stirred to obtain the primary particles.

Secondary particles with a volume average diameter of 20 μm are obtained by grading spheric particles of crosslinked polymethylmethacrylate containing carbon (Techpolymer MBX-20-BLACK, Sekisui Plastics Co.).

The primary particles and secondary particles are then mixed 2:1 by weight.

The display substrate and back substrate are made by forming a transparent ITO electrode for each pixel on a 50 mm×50 mm×1.1 mm 7059 glass support base, and then forming thereon a 5 μm thick polycarbonate resin layer (PC-Z, Mitsubishi Gas Chemical Co.). A spacer is made by removing a 20 mm×20 mm square from the center of a 50 mm×50 mm×0.3 mm silicon rubber sheet, and placed on the back substrate. Approximately 27 mg of the above described particle mixture is then screened and deposited into the square space formed in the middle of the spacer. The display substrate is then bonded to the spacer, both substrates press together using double clips to adhere the spacer to both substrates and complete the display medium.

The electrodes of the display substrate are connected to the power supply, the back substrate electrodes are connected to ground, and voltage is applied to initialize the display medium. The average charge of the primary and secondary particles is measured using charge spectrography and found to be −15 fC and +15 fC, respectively.

A +500V rectangular wave voltage pulse is applied to the ITO electrodes of the display substrate of this display medium so that the entire display substrate is white. Next, a negative rectangular wave voltage pulse is applied for 25 msec to the ITO electrodes of the display substrate in this display medium. The voltage supply is then stopped and the image density on the display substrate is measured using a densitometer (X-Rite 404A, X-Rite Co.). A +500V rectangular wave voltage pulse is then applied to the ITO electrodes of the display substrate to turn the entire display substrate white. The above procedure is then repeated while gradually lowering the negative rectangular wave voltage.

A −500V rectangular wave voltage pulse is likewise applied to the ITO electrodes of the display substrate to turn the entire display substrate black. Next, a positive rectangular wave voltage pulse is applied for 25 msec to the ITO electrodes of the display substrate in this display medium. The voltage supply is then stopped and the image density on the display substrate is measured using a densitometer (X-Rite 404A, X-Rite Co.). A −500V rectangular wave voltage pulse is then applied to the ITO electrodes of the display substrate to turn the entire display substrate black. The above procedure is then repeated while gradually increasing the positive rectangular wave voltage. The results are shown in FIG. 8.

Figure 8:
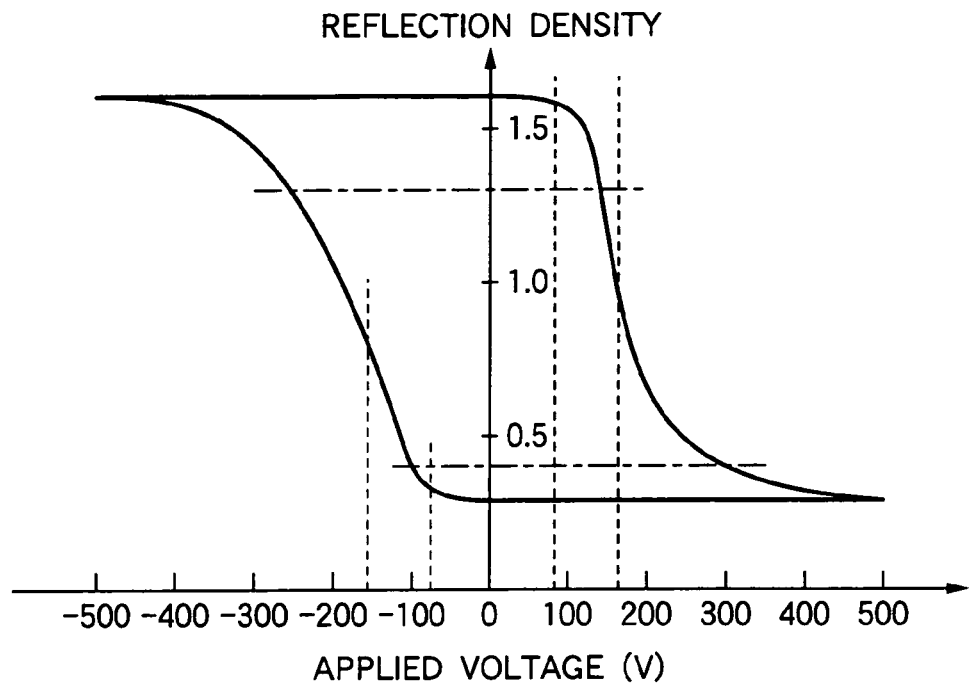
FIG. 8 shows the relationship between applied voltage and reflection density in the method of comparison 1.

As shown in FIG. 8, white density is substantially saturated when the applied voltage is approximately +350 V, and black density is substantially saturated at approximately −400V. The applied voltage needed to achieve visually good white density ($\leq 0.4$) is approximately +300V, and the applied voltage needed to achieve visually good black density ($\geq 1.3$) is approximately −270V.

Furthermore, the particle drive start voltage at which black pixels begin to change to white is approximately 80 V, and the particle drive start voltage for changing pixel color from white to black is also approximately −80 V.

The electrode configuration of this display medium is also changed for use with passive matrix drive, and the test repeated with the following results. That is, if a voltage exceeding 80 V is applied as $V_{SW}$ or $V_{LB}$, or a voltage less than −80 V is applied as $V_{LW}$ or $V_{SB}$, black density drops or white density rises. Therefore, $V_{SW}$ or $V_{LB}$ must be 80 V or less, and $V_{LW}$ or $V_{SB}$ must be −80 V or greater, and the voltage applied to both substrates to change the display is 160 V [$V_{SW}$−$V_{LW}$] or −160 V [$V_{SB}$−$V_{LB}$]. As shown in FIG. 8, the displayable white density on black background at 160

V is approximately 0.95, the displayable black density on white background at −160 V is approximately 0.75, and an image can be displayed, but contrast is low and a sharp image cannot be displayed. Furthermore, because the rise in image density relative to the applied voltage is gradual near the particle drive start voltage, display irregularities occur easily and image quality deteriorates severely.

Therefore, when this display medium drive method is applied to a passive matrix drive system, contrast is insufficient and image quality is poor.

Embodiment 1

Using the display medium prepared as described in comparison 1 above, a +500V rectangular wave voltage pulse is applied to the ITO electrode of the display substrate to turn the display substrate entirely white. A positive rectangular wave voltage pulse is then applied to the ITO electrodes of the display substrate for 25 msec, and immediately thereafter a negative rectangular wave voltage pulse of the same absolute value as the above positive rectangular wave voltage pulse is applied to the ITO electrodes of the display substrate for 25 msec. The voltage supply is then stopped and the image density on the display substrate is measured using a densitometer (X-Rite 404A, X-Rite Co.).

A +500V rectangular wave voltage pulse is then applied to the ITO electrodes of the display substrate to turn the entire display substrate white. The above procedure is then repeated while gradually increasing the absolute value of the voltage pulse.

A −500V rectangular wave voltage pulse is likewise applied to the ITO electrodes of the display substrate to turn the entire display substrate black. A negative rectangular wave voltage pulse is then applied to the ITO electrodes of the display substrate for 25 msec, and immediately thereafter a positive rectangular wave voltage pulse of the same absolute value as the above negative rectangular wave voltage pulse is applied to the ITO electrodes of the display substrate for 25 msec. The voltage supply is then stopped and the image density on the display substrate is measured using a densitometer (X-Rite 404A, X-Rite Co.).

A −500V rectangular wave voltage pulse is then applied to the ITO electrodes of the display substrate to turn the entire display substrate black. The above procedure is then repeated while gradually increasing the absolute value of the voltage pulse. The results are shown in FIG. 9 together with the results from the above comparison 1.

Figure 9:
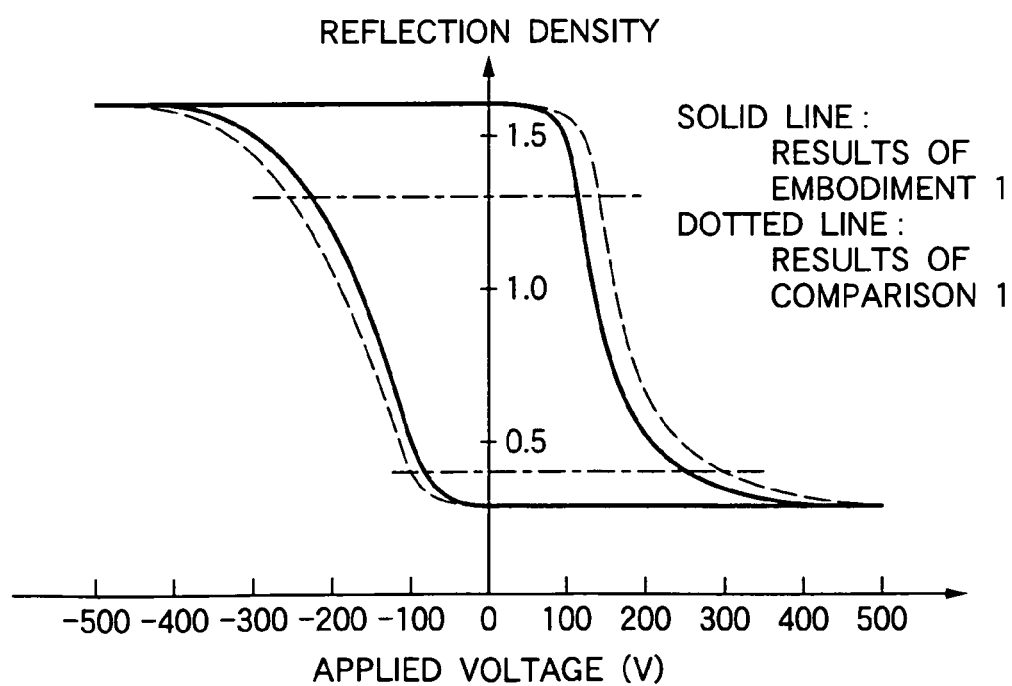
FIG. 9 shows the relationship between applied voltage and reflection density in the method of embodiment 1.

As shown in FIG. 9, white density is substantially saturated when the applied voltage is approximately +300V, and black density is substantially saturated at approximately −280V. The applied voltage needed to achieve visually good white density ($\leqq 0.4$) is approximately 240 V, and the applied voltage needed to achieve visually good black density ($\geqq 1.3$) is approximately −220 V. The desired contrast is achieved at a voltage with a lower absolute value than in the above comparison 1. Even higher contrast is achieved when the same voltage is applied.

Embodiment 2

Using the display medium of embodiment 1 above, a +500V rectangular wave voltage pulse is applied to the ITO electrode of the display substrate to turn the display substrate entirely white. A +200V rectangular wave voltage pulse is then applied to the ITO electrodes of the display substrate for 25 msec, and immediately thereafter a −200V rectangular wave voltage pulse is applied to the ITO electrodes of the display substrate for 25 msec. The voltage supply is then stopped and the image density on the display substrate is measured using a densitometer (X-Rite 404A, X-Rite Co.). Applying the above pulse pair and density measurement are then repeated. The results are shown in FIG. 10.

Figure 10:
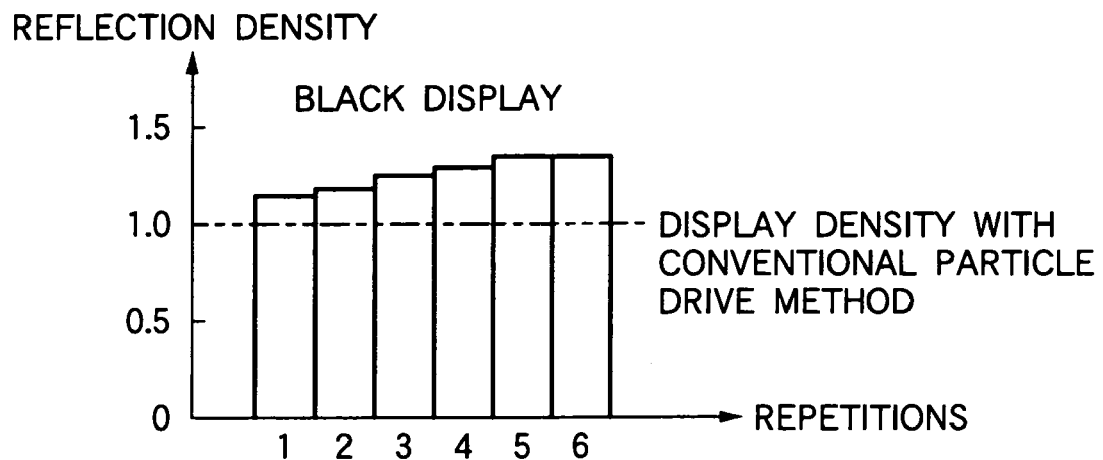
FIG. 10 shows the relationship between applied voltage pulse count and reflection density in the method of embodiment 2.

As shown in FIG. 10, black image density gradually increases as the number of time the drive voltage pulse is applied to the display medium increases, and is substantially saturated after five times. Note that in FIG. 10 the density (1.0) obtained by applying a −200-V pulse only once for 25 msec after setting the entire display substrate white is shown by way of comparison as the display density achieved with a conventional drive method.

Embodiment 3

Using the display medium of embodiment 1 above, a +500V rectangular wave voltage pulse is applied to the ITO electrode of the display substrate to turn the display substrate entirely white. A positive rectangular wave voltage pulse is then applied to the ITO electrodes of the display substrate for 25 msec, and immediately thereafter a negative rectangular wave voltage pulse of the same absolute value as the above positive rectangular wave voltage pulse is applied to the ITO electrodes of the display substrate for 25 msec. This pair of pulses is applied continuously five times. The voltage supply is then stopped and the image density on the display substrate is measured using a densitometer (X-Rite 404A, X-Rite Co.).

A +500V rectangular wave voltage pulse is then applied to the ITO electrodes of the display substrate to turn the entire display substrate white. The above procedure is then repeated while gradually increasing the absolute value of the voltage pulse.

A −500V rectangular wave voltage pulse is likewise applied to the ITO electrodes of the display substrate of the display medium used in embodiment 1 to turn the entire display substrate black. A negative rectangular wave voltage pulse is then applied to the ITO electrodes of the display substrate for 25 msec, and immediately thereafter a positive rectangular wave voltage pulse of the same absolute value as the above negative rectangular wave voltage pulse is applied to the ITO electrodes of the display substrate for 25 msec. This pulse pair is applied continuously five times. The voltage supply is then stopped and the image density on the display substrate is measured using a densitometer (X-Rite 404A, X-Rite Co.).

A −500V rectangular wave voltage pulse is then applied to the ITO electrodes of the display substrate to turn the entire display substrate black. The above procedure is then repeated while gradually increasing the absolute value of the voltage pulse. The results are shown in FIG. 11 together with the results from the above embodiment 1.

Figure 11:
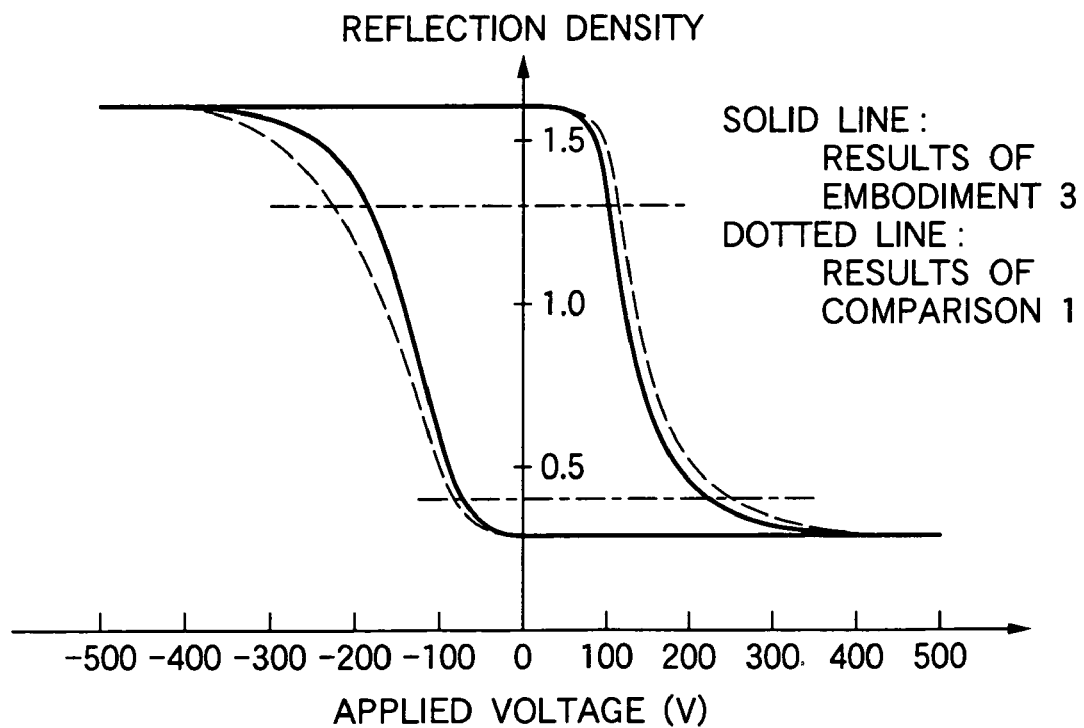
FIG. 11 shows the relationship between applied voltage and reflection density in the method of embodiment 3.

As shown in FIG. 11, white density is substantially saturated when the applied voltage is approximately +280 V, and black density is substantially saturated at approximately −240 V. The applied voltage needed to achieve visually good white density ($\leqq 0.4$) is approximately +220 V, and the applied voltage needed to achieve visually good black density ($\geqq 1.3$) is approximately −190 V. This embodiment thus achieves even better results than the above first embodiment.

Embodiment 4

Using the display medium of embodiment 1 above, a +500V rectangular wave voltage pulse is applied to the ITO electrode of the display substrate to turn the display substrate entirely white. A positive rectangular wave voltage pulse is then applied to the ITO electrodes of the display substrate for 25 msec, and immediately thereafter a negative rectangular wave voltage pulse of the same absolute value as the above positive rectangular wave voltage pulse is applied to the ITO electrodes of the display substrate for 25 msec. The voltage supply is then stopped and the image density on the display substrate is measured using a densitometer (X-Rite 404A, X-Rite Co.).

A +500V rectangular wave voltage pulse is then applied to the ITO electrodes of the display substrate to turn the entire display substrate white. The above procedure is then repeated while changing the voltage of the voltage pulse and the pulse apply time (that is, the total positive and negative pulse apply time where each pulse is applied for the same time) to determine the relationship between apply time and particle drive start voltage. The results are shown in FIG. 12.

A −500V rectangular wave voltage pulse is then applied to the ITO electrodes of the display substrate of the display medium used in embodiment 1 to turn the entire display substrate black. A negative rectangular wave voltage pulse is then applied to the ITO electrodes of the display substrate, and immediately thereafter a positive rectangular wave voltage pulse of the same absolute value as the above negative rectangular wave voltage pulse is applied to the ITO electrodes of the display substrate. The voltage supply is then stopped and the image density on the display substrate is measured using a densitometer (X-Rite 404A, X-Rite Co.).

A −500V rectangular wave voltage pulse is then applied to turn the entire display substrate black. The above procedure is then repeated while changing the voltage of the voltage pulse and the pulse apply time (that is, the total positive and negative pulse apply time where each pulse is applied for the same time) to determine the relationship between apply time and particle drive start voltage. The results are shown in FIG. 13.

Figure 12:
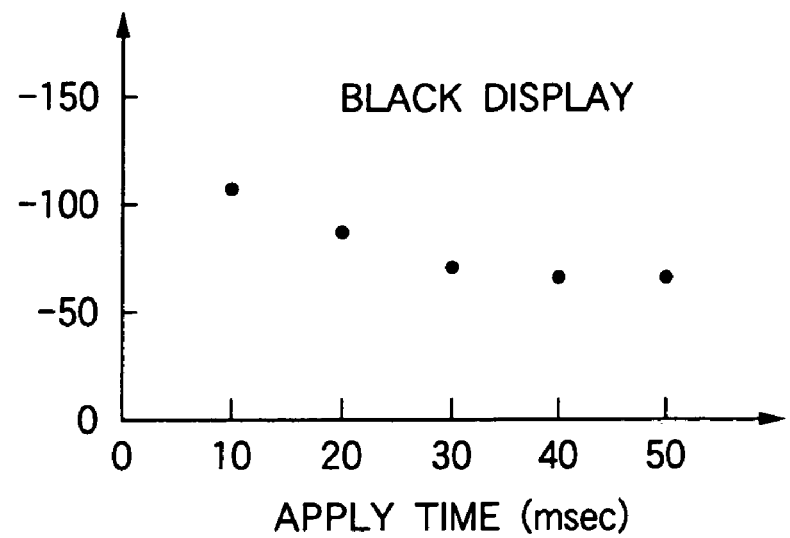
FIG. 12 shows the relationship between voltage pulse apply time and particle drive start voltage when displaying black in the method of embodiment 4.
Figure 13:
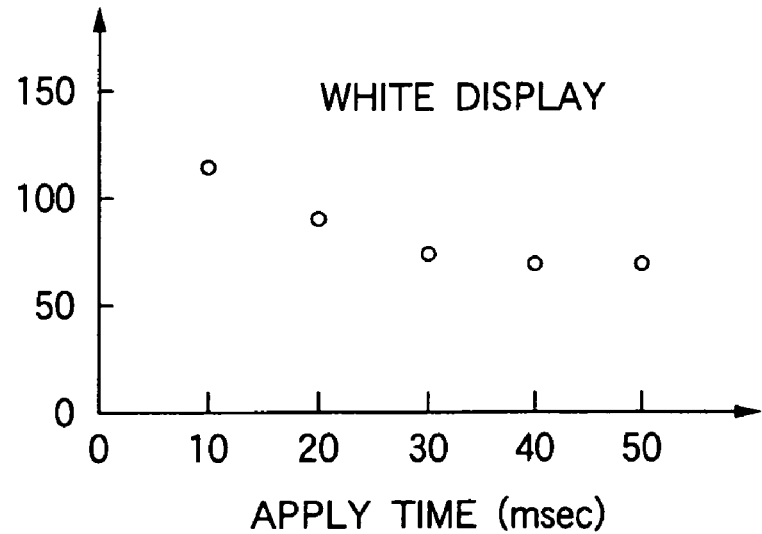
FIG. 13 shows the relationship between voltage pulse apply time and particle drive start voltage when displaying white in the method of embodiment 4.

As shown in FIG. 12 and FIG. 13 the absolute value of the particle drive start voltage rises when the pulse apply time is shorter than a particular time (30 to 40 msec in this embodiment). A desirable particle drive start voltage is achieved with a 20 msec pulse apply time.

Embodiment 5

Using the display medium of embodiment 1 above, a +500V rectangular wave voltage pulse is applied to the ITO electrode of the display substrate to turn the display substrate entirely white. A positive rectangular wave voltage pulse is then applied to the ITO electrodes of the display substrate for 10 msec, and immediately thereafter a negative rectangular wave voltage pulse of the same absolute value as the above positive rectangular wave voltage pulse is applied to the ITO electrodes of the display substrate for 10 msec. The voltage supply is then stopped and the image density on the display substrate is measured using a densitometer (X-Rite 404A, X-Rite Co.).

A +500V rectangular wave voltage pulse is then applied to turn the entire display substrate white. This procedure is then repeated while changing the absolute value of the voltage pulse.

A −500V rectangular wave voltage pulse is then applied to the ITO electrodes of the display substrate of the display medium used in embodiment 1 to turn the entire display substrate black. A negative rectangular wave voltage pulse is then applied to the ITO electrodes of the display substrate for 10 msec, and immediately thereafter a positive rectangular wave voltage pulse of the same absolute value as the negative rectangular wave voltage pulse is applied to the ITO electrodes of the display substrate for 10 msec. The voltage supply is then stopped and the image density on the display substrate is measured using a densitometer (X-Rite 404A, X-Rite Co.).

A −500V rectangular wave voltage pulse is then applied to turn the entire display substrate black. The above procedure is then repeated while changing the voltage of the voltage pulse. The results are shown in FIG. 14 together with the results from the above embodiment 1 for reference.

Figure 14:
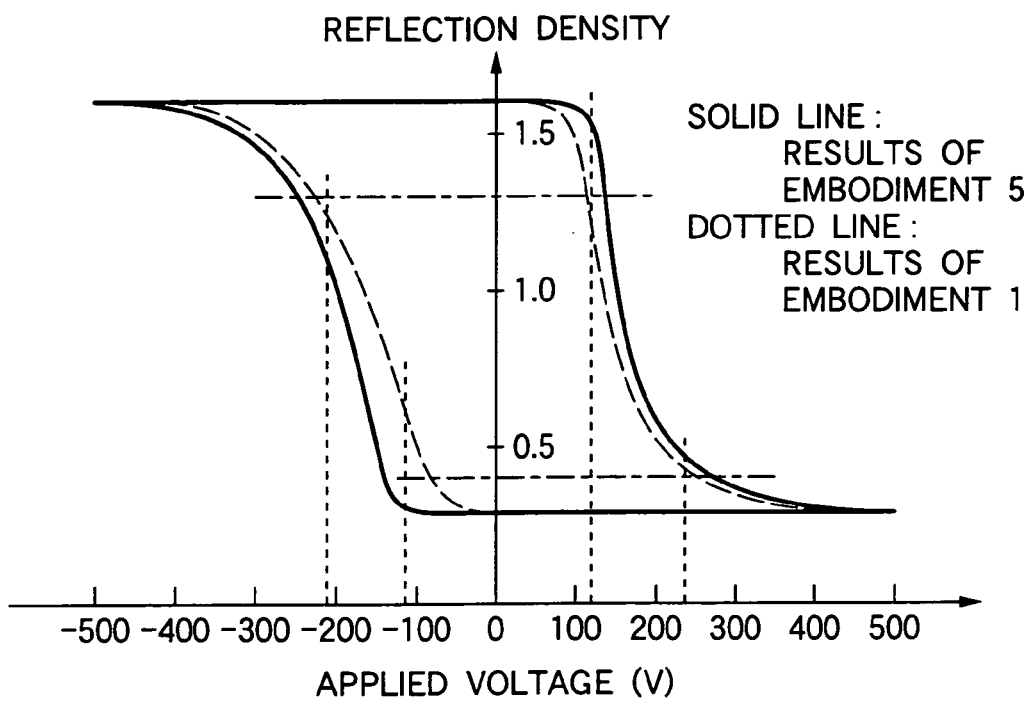
FIG. 14 shows the relationship between applied voltage and reflection density in the method of embodiment 5.

As shown in FIG. 14, the absolute value of the particle drive start voltage is greater than in the above embodiment 1, and the increase in image density relative to the applied voltage is sharper.

The electrode configuration of this display medium is also changed for passive matrix drive and the results of using the method of the present invention with passive matrix drive are obtained. In this case, the particle drive start voltage applied to change the pixel color from black to white is approximately 120 V, and the voltage that can be applied to change the pixel color from black to white is approximately 240 V. From FIG. 14, the displayable white density at this voltage is approximately 0.45, and compared with the particle drive method in comparison 1, the displayable white density can be decreased.

Furthermore, the particle drive start voltage at which pixel color starts to change from white to black with passive matrix drive is approximately −110 V, and the voltage that can be applied to change pixel color from white to black is approximately −220 V. From FIG. 14, the displayable black density at this voltage is approximately 1.20, and compared with the particle drive method in comparison 1, the displayable black density can be increased.

We therefore know that the display medium drive method of this embodiment can be applied to passive matrix drive devices, and unlike the above comparison 1 can display images with sufficient contrast and good image quality.

Embodiment 6

Figure 15:
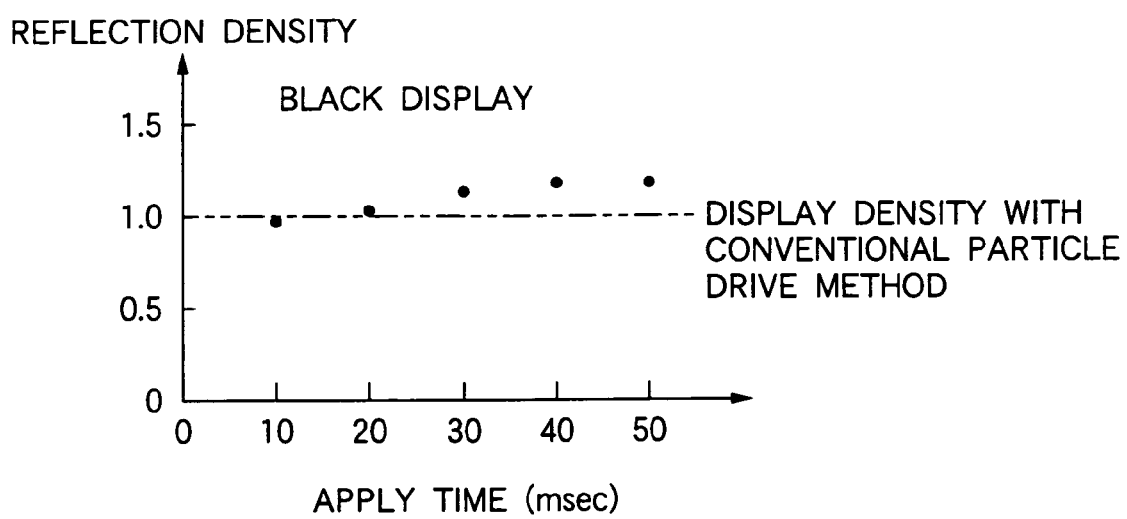
FIG. 15 shows the relationship between voltage pulse apply time and reflection density in the method of embodiment 6.

Using the display medium of embodiment 1 above, a +500V rectangular wave voltage pulse is applied to the ITO electrode of the display substrate to turn the display substrate entirely white. A +200V rectangular wave voltage pulse is then applied to the ITO electrodes of the display substrate, and immediately thereafter a −200V rectangular wave voltage pulse is applied to the ITO electrodes of the display substrate. The voltage supply is then stopped and the image density on the display substrate is measured using a densitometer (X-Rite 404A, X-Rite Co.). A +500V rectangular wave voltage pulse is then applied to the ITO electrodes of the display substrate to turn the entire display substrate white. The above procedure is repeated while changing the pulse apply time (the total apply time of both positive and negative pulses where the apply time is the same for both pulses) to determine the relationship between pulse apply time and image density. The results are shown in FIG. 15. Note that in FIG. 15 the density (1.0) obtained by applying a −200V pulse only once for 25 msec after setting the entire display substrate white is shown by way of comparison as the display density achieved with a conventional drive method.

From FIG. 15 we know that image density decreases as the apply time becomes shorter, but that image density comparable to that achieved with the conventional drive method can be achieved by the method of this embodiment with an apply time of 10 to 20 msec.

Embodiment 7

Using the display medium of embodiment 1 above, a +500V rectangular wave voltage pulse is applied to the ITO electrode of the display substrate to turn the display substrate entirely white. A +200V rectangular wave voltage pulse is then applied to the ITO electrodes of the display substrate for 10 msec, and immediately thereafter a −200V rectangular wave voltage pulse is applied to the ITO electrodes of the display substrate for 10 msec. The voltage supply is then stopped and the image density on the display substrate is measured using a densitometer (X-Rite 404A, X-Rite Co.). Applying the above pulse pair and measuring image density are then repeated. The results are shown in FIG. 16.

Figure 16:
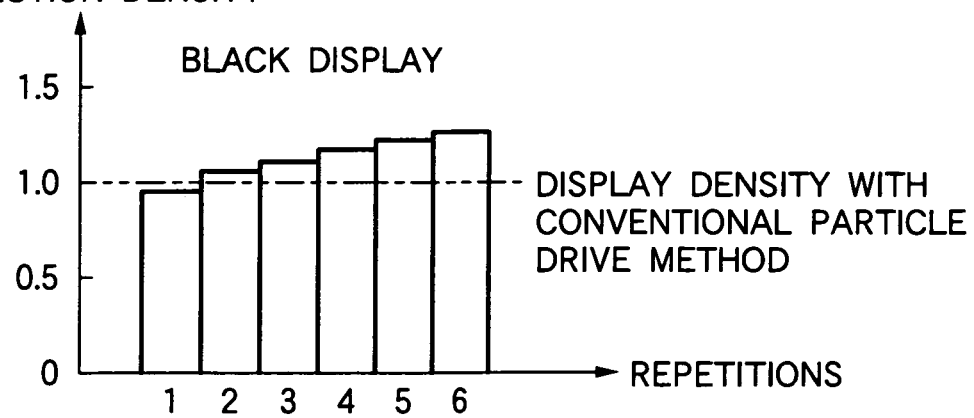
FIG. 16 shows the relationship between applied voltage pulse count and reflection density in the method of embodiment 7.

As will be known from FIG. 16, image density is lower than in embodiment 2 because the pulse apply time is short, but black image density gradually increases as the number of applied voltage pulses increases. Furthermore, the particle drive start voltage does not depend on the number of pulses applied, and remains substantially unchanged. Note, further, that in FIG. 16 the density (1.0) obtained by applying a −200V pulse only once for 25 msec after setting the entire display white is shown by way of comparison as the display density achieved with a conventional drive method.

Embodiment 8

Using the display medium of embodiment 1 above, a +500V rectangular wave voltage pulse is applied to the ITO electrode of the display substrate to turn the display substrate entirely white. A positive rectangular wave voltage pulse is then applied to the ITO electrodes of the display substrate for 10 msec, and immediately thereafter a negative rectangular wave voltage pulse of the same absolute value as the above positive rectangular wave voltage pulse is applied to the ITO electrodes of the display substrate for 10 msec. Applying this pulse pair is repeated continuously 5 times. The voltage supply is then stopped and the image density on the display substrate is measured using a densitometer (X-Rite 404A, X-Rite Co.).

A +500V rectangular wave voltage pulse is then applied to the ITO electrodes of the display substrate to turn the entire display substrate white. This procedure is then repeated while gradually increasing the absolute value of the voltage pulse.

A −500V rectangular wave voltage pulse is then applied to the ITO electrodes of the display substrate of the display medium used in embodiment 1 to turn the entire display substrate black. A negative rectangular wave voltage pulse is then applied to the ITO electrodes of the display substrate for 10 msec, and immediately thereafter a positive rectangular wave voltage pulse of the same absolute value as the negative rectangular wave voltage pulse is applied to the ITO electrodes of the display substrate for 10 msec. Applying this pulse pair is repeated continuously 5 times. The voltage supply is then stopped and the image density on the display substrate is measured using a densitometer (X-Rite 404A, X-Rite Co.).

A −500V rectangular wave voltage pulse is then applied to the ITO electrodes of the display substrate to turn the entire display substrate black. This procedure is then repeated while gradually increasing the absolute value of the voltage pulse. The results are shown in FIG. 17 together with the results from the above embodiment 5 for reference.

Figure 17:
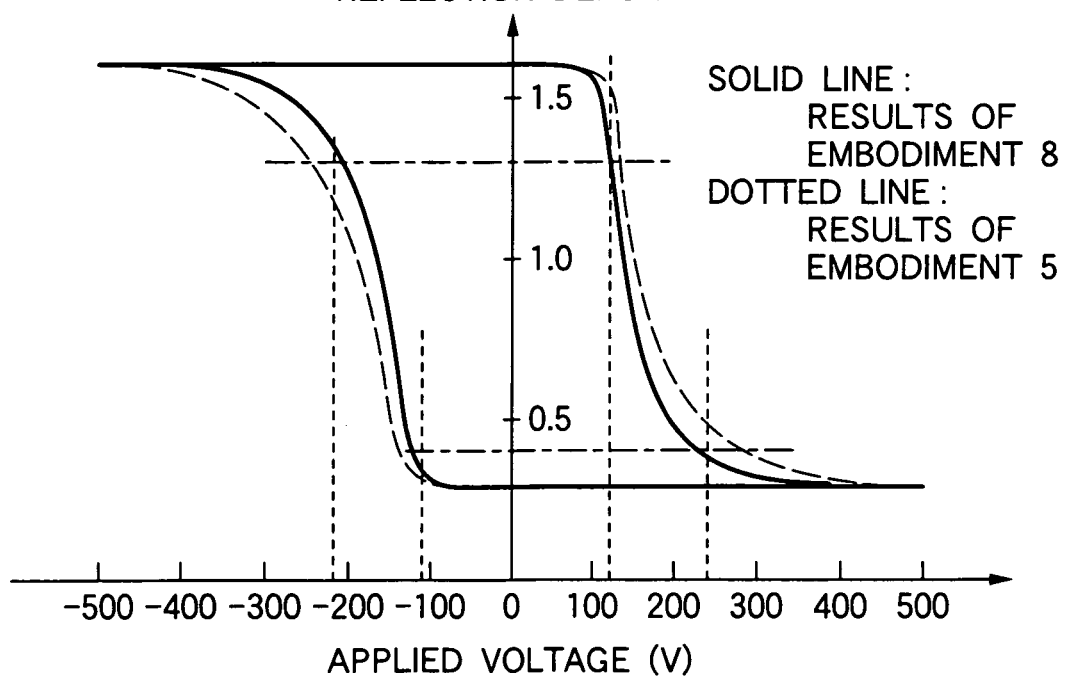
FIG. 17 shows the relationship between applied voltage and reflection density in the method of embodiment 8.

From FIG. 17 we know that by repeatedly applying the particle drive voltage pulse with a short apply time, an applied voltage—display density curve with a sharper rising slope than achieved with the above embodiment 5 can be achieved while maintaining the particle drive start voltage.

The electrode configuration of this display medium is also changed for passive matrix drive and the results of using the method of the present invention with passive matrix drive are obtained. In this case, the particle drive start voltage applied to change the pixel color from black to white is approximately 120 V, the same as in embodiment 5, and the voltage that can be applied to change the pixel color from black to white is approximately 240 V. The displayable white density at this voltage is approximately 0.35, and compared with the particle drive method in comparison 1, the displayable white density can be decreased.

Furthermore, the particle drive start voltage applied to change the pixel color from white to black with passive matrix drive is approximately −110 V, the same as with embodiment 5 above, and the voltage that can be applied to change pixel color from white to black is approximately −220 V. From FIG. 17, the displayable black density at this voltage is approximately 1.35, and compared with the particle drive method in comparison 1, the displayable black density can be increased.

We therefore know that the display medium drive method of this embodiment can be applied to passive matrix drive devices, and unlike the above comparison 1 can display images with sufficient contrast and good image quality comparable to an active matrix drive method.

Embodiment 9

Using the display medium of embodiment 1 above, a +500V rectangular wave voltage pulse is applied to the ITO electrode of the display substrate to turn the display substrate entirely white. A negative rectangular wave voltage pulse is then applied to the ITO electrodes of the display substrate for 20 msec, and immediately thereafter a positive voltage pulse of opposite polarity to the apparent black particle drive start voltage (−110 V) is applied to the ITO electrodes of the display substrate for 20 msec. The voltage supply is then stopped and the image density on the display substrate is measured using a densitometer (X-Rite 404A, X-Rite Co.).

Next, a +500V rectangular wave voltage pulse is applied to the ITO electrode of the display substrate to turn the display substrate entirely white. The above procedure is then repeated while gradually lowering the voltage of the negative rectangular wave voltage pulse.

A −500V rectangular wave voltage pulse is then applied to the ITO electrodes of the display substrate of this display medium to turn the entire display substrate black. A positive rectangular wave voltage pulse is then applied to the ITO electrodes of the display substrate for 20 msec, and immediately thereafter a negative rectangular wave voltage pulse of opposite polarity to the apparent white particle drive start voltage (+110 V) is applied to the ITO electrodes of the display substrate for 20 msec. The voltage supply is then stopped and the image density on the display substrate is measured using a densitometer (X-Rite 404A, X-Rite Co.).

Next, a −500V rectangular wave voltage pulse is applied to the ITO electrode of the display substrate to turn the display substrate entirely black. The above procedure is then repeated while gradually increasing the voltage of the positive rectangular wave voltage pulse. Results are shown in FIG. 18 together with the results from the above comparison 1 for reference.

Figure 18:
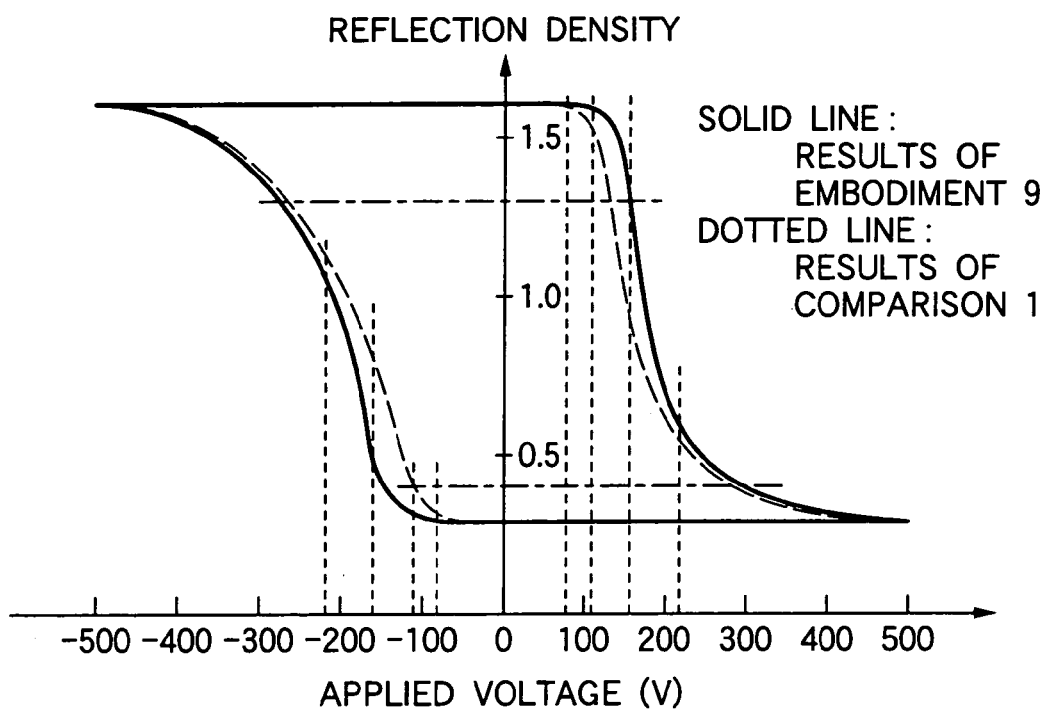
FIG. 18 shows the relationship between applied voltage and reflection density in the method of embodiment 9.

As shown in FIG. 18, the absolute value of the particle drive start voltage can be increased compared with the voltage of the drive method in comparison 1 above. This is because the particles that move easily in the drive method of comparison 1 even though a field with a low absolute field strength is applied are pulled back to the substrate by the particle drive method of this invention before they can move so that there is no apparent particle movement.

The electrode configuration of this display medium is also changed for passive matrix drive and the results of using the method of the present invention with passive matrix drive are obtained. As shown in FIG. 18, the particle drive start voltage applied to change the pixel color from black to white is approximately 110 V, and the voltage that can be applied to change the pixel color from black to white is approximately 220 V. The displayable white density at this voltage is approximately 0.60, and compared with the particle drive method in comparison 1, the displayable white density can be decreased.

Furthermore, the particle drive start voltage applied to change the pixel color from white to black with passive matrix drive is approximately −110 V as shown in FIG. 18, and the voltage that can be applied to change pixel color from white to black is approximately −220 V. From FIG. 18, the displayable black density at this voltage is approximately 1.05, and compared with the particle drive method in comparison 1, the displayable black density can be increased.

By applying the method of the present invention to passive matrix drive, it is therefore possible to improve contrast compared with using the drive method of the above comparison 1 for passive matrix drive.

Embodiment 10

Figure 19:
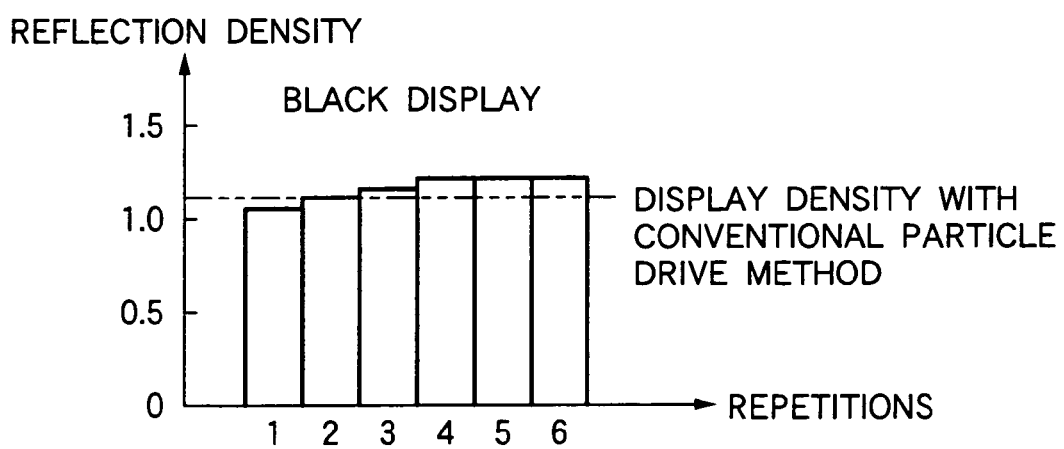
FIG. 19 shows the relationship between applied voltage pulse count and reflection density in the method of embodiment 10.

A display medium is prepared in the same way as the display medium used in embodiment 1 except that parallel ITO electrode strips are formed at equal intervals on the display substrate and back substrate, and the substrates then arranged so that the electrodes of the two substrates are mutually orthogonal. The display substrate electrodes and back substrate electrodes are connected to the power supply. A +110V rectangular wave voltage pulse is applied to he ITO electrodes of the display substrate, and a −110V rectangular wave voltage pulse is simultaneously applied to the ITO electrodes of the back substrate to set the entire display substrate to white. Next, a −110V rectangular wave voltage pulse is applied to the ITO electrodes of the display substrate of this display medium and a +110V rectangular wave voltage pulse is simultaneously applied to the ITO electrodes of the back substrate for 20 msec. Immediately thereafter a +110 V rectangular wave voltage pulse is applied to the ITO electrodes of the display substrate for 10 msec, and a −110 V-rectangular wave voltage pulse is separately applied to the ITO electrodes of the back substrate for 10 msec. The voltage supply is then stopped and the image density on the display substrate is measured using a densitometer (X-Rite 404A, X-Rite Co.). Applying the pulse pairs and density measurements are then repeated. The results are shown in FIG. 19. Note that the result of applying simultaneously a −110V rectangular wave voltage pulse to the ITO electrodes of the display substrate and a +110V rectangular wave voltage pulse to the ITO electrodes of the back substrate once each only for 20 msec is also shown in FIG. 19 as the display density achieved with the conventional drive method.

From FIG. 19 we know that the display density gradually increases if the voltage pulse is repeatedly applied, and display density can be saturated by applying the voltage pulses four times. It should be noted that there is substantially no change in the particle drive start voltage even when the voltage pulse is repeatedly applied.

Embodiment 11

Using the display medium of embodiment 1 above, a +500V rectangular wave voltage pulse is applied to the ITO electrode of the display substrate to turn the display substrate entirely white. A negative rectangular wave voltage pulse is then applied to the ITO electrodes of the display substrate for 20 msec, and immediately thereafter a positive voltage pulse of opposite polarity to the apparent black particle drive start voltage (−110 V) is applied to the ITO electrodes of the display substrate for 20 msec. Applying this pulse pair is repeated continuously 5 times. The voltage supply is then stopped and the image density on the display substrate is measured using a densitometer (X-Rite 404A, X-Rite Co.).

Next, a +500V rectangular wave voltage pulse is applied to the ITO electrode of the display substrate to turn the display substrate entirely white. The above procedure is then repeated while gradually lowering the voltage of the negative rectangular wave voltage pulse.

A −500V rectangular wave voltage pulse is then applied to the ITO electrodes of the display substrate of this display medium to turn the entire display substrate black. A positive rectangular wave voltage pulse is then applied to the ITO electrodes of the display substrate for 20 msec, and immediately thereafter a negative rectangular wave voltage pulse of opposite polarity to the apparent white particle drive start voltage (+110 V) is applied to the ITO electrodes of the display substrate for 20 msec. Applying this pulse pair is repeated continuously 5 times. The voltage supply is then stopped and the image density on the display substrate is measured using a densitometer (X-Rite 404A, X-Rite Co.).

Figure 20:
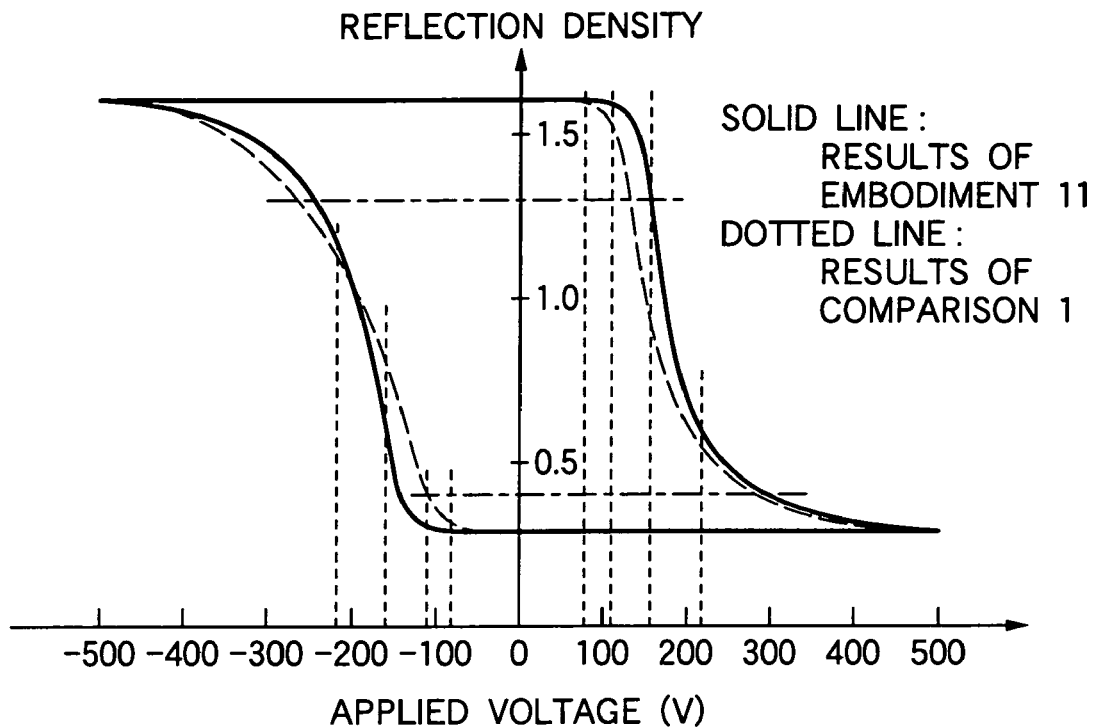
FIG. 20 shows the relationship between applied voltage and reflection density in the method of embodiment 11.

Next, a −500V rectangular wave voltage pulse is applied to the ITO electrode of the display substrate to turn the display substrate entirely black. The above procedure is then repeated while gradually increasing the voltage of the positive rectangular wave voltage pulse. Results are shown in FIG. 20 together with the results from the above comparison 1 for reference.

The electrode configuration of this display medium is also changed for passive matrix drive and the results of using the method of the present invention with passive matrix drive are obtained. In this case the voltage that can be applied to change the pixel color from black to white is the same approximately 220 V as in embodiment 9. The displayable white density at this voltage is approximately 0.50, and compared with the particle drive method in comparison 1, the displayable white density can be decreased.

Furthermore, the voltage that can be applied to change the pixel color from white to black with passive matrix drive is the same approximately −220 V as in embodiment 9. The displayable black density at this voltage is approximately 1.20 from FIG. 20, and compared with the particle drive method in comparison 1, the displayable black density can be increased.

By applying the method of the present invention to passive matrix drive, it is therefore possible to improve contrast compared with using the drive method of the above comparison 1 for passive matrix drive.

Embodiment 12

Figure 21:
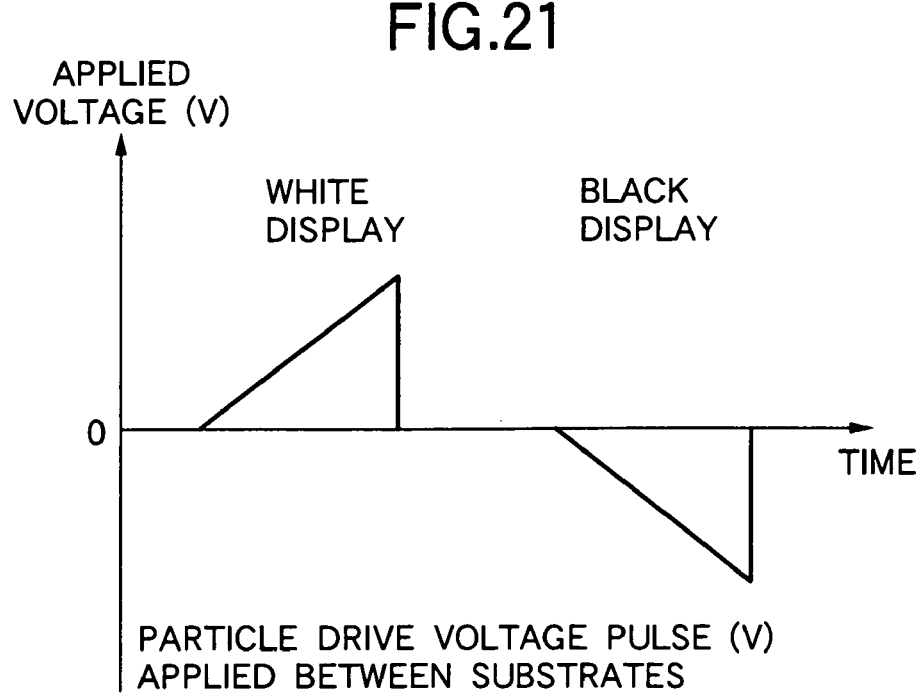
FIG. 21 describes the voltage pulse used in embodiment 12.

Using the display medium of embodiment 1 above, a +500V rectangular wave voltage pulse is applied to the ITO electrode of the display substrate to turn the display substrate entirely white. Next, as shown in FIG. 21, a negative sawtooth wave voltage pulse is applied to the ITO electrodes of the display substrate for 30 msec. The voltage supply is then stopped and the image density on the display substrate is measured using a densitometer (X-Rite 404A, X-Rite Co.).

Next, a +500V rectangular wave voltage pulse is applied to the ITO electrode of the display substrate to turn the display substrate entirely white. The above steps are then repeated while gradually decreasing the peak voltage of the negative sawtooth wave.

A −500V rectangular wave voltage pulse is then applied to the ITO electrodes of the display substrate to set the entire display substrate to black. Next, as shown in FIG. 21, a positive sawtooth wave voltage pulse is applied to the ITO electrodes of the display substrate for 30 msec. The voltage supply is then stopped and the image density on the display substrate is measured using a densitometer (X-Rite 404A, X-Rite Co.).

Figure 22:
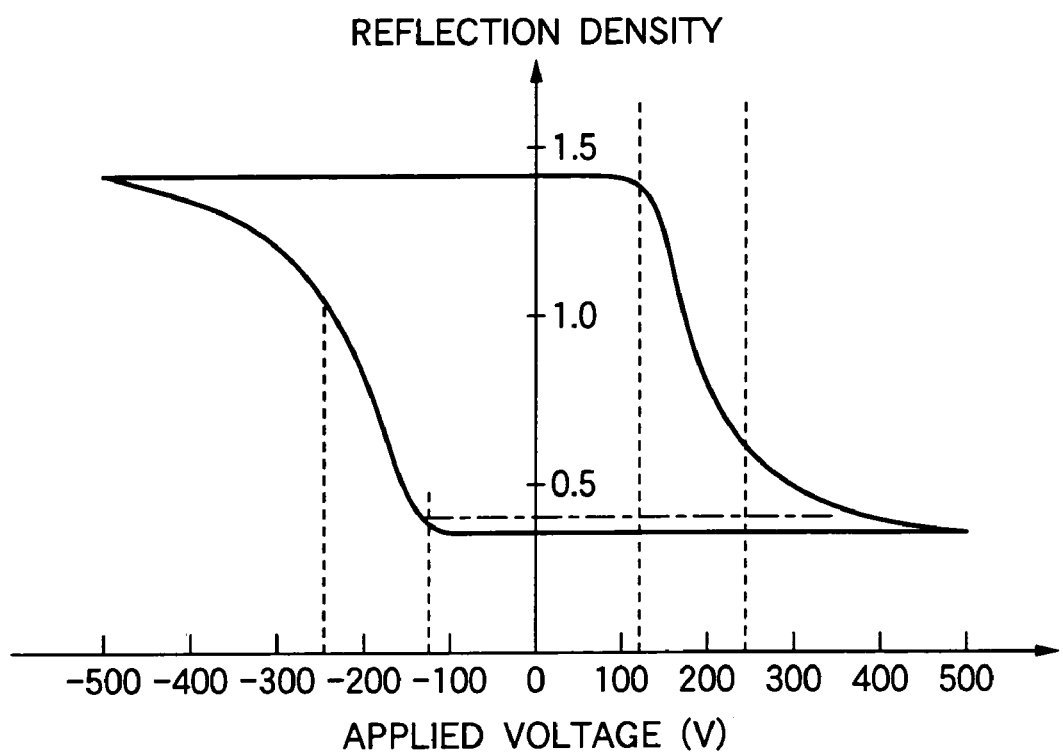
FIG. 22 shows the relationship between applied voltage and reflection density in the method of embodiment 12.

Next, a −500V rectangular wave voltage pulse is applied to the ITO electrode of the display substrate to turn the display substrate entirely black. The above steps are then repeated while gradually increasing the peak voltage of the positive sawtooth wave. Results are shown in FIG. 22. It should be noted that voltage shown in FIG. 22 is the peak voltage of one pulse.

As shown in FIG. 22 the particle drive start voltage applied to change the pixel color from black to white is approximately 120 V, and is approximately −120 V applied to change from white to black. Therefore, when this method is applied to passive matrix drive, the voltage applied to both substrates when these voltages are applied is approximately +/−240 V, and the displayable white density at approximately 240 V is approximately 0.60 from FIG. 22. In addition, the displayable black density at approximately −240 V is approximately 1.00. We can therefore conclude that applying the method of this embodiment to passive matrix drive improves contrast when compared with the drive method of comparison 1 applied to passive matrix drive.

Embodiment 13

Using the display medium of embodiment 1 above, a +500V rectangular wave voltage pulse is applied to the ITO electrode of the display substrate to turn the display substrate entirely white. Next, a sawtooth wave voltage pulse with a −240 V peak voltage is applied to the ITO electrodes of the display substrate for 30 msec. The voltage supply is then stopped and the image density on the display substrate is measured using a densitometer (X-Rite 404A, X-Rite Co.). Applying the above pulse and density measurement are then repeated. The results are shown in FIG. 23.

Figure 23:
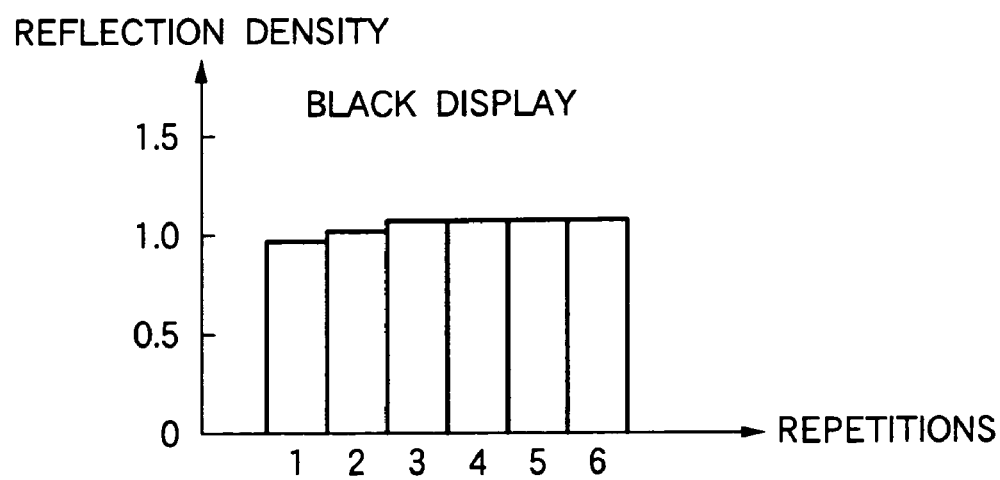
FIG. 23 shows the relationship between applied voltage pulse count and reflection density in the method of embodiment 13.

As shown in FIG. 23, repeatedly applying this voltage pulse gradually increases the display density until the voltage pulse has been applied three times. Note, further, that there is substantially no change in the particle drive start voltage as a result of repeatedly applying the voltage pulse.

Embodiment 14

Using the display medium of embodiment 1 above, a +500V rectangular wave voltage pulse is applied to the ITO electrode of the display substrate of the display medium to turn the display substrate entirely white. Next, a negative sawtooth wave voltage pulse is applied to the ITO electrodes of the display substrate for 30 msec. This pulse is applied three times, and the voltage supply is then stopped. Image density on the display substrate is then measured using a densitometer (X-Rite 404A, X-Rite Co.) The above steps are then repeated while gradually decreasing the peak voltage of the negative sawtooth wave.

Figure 24:
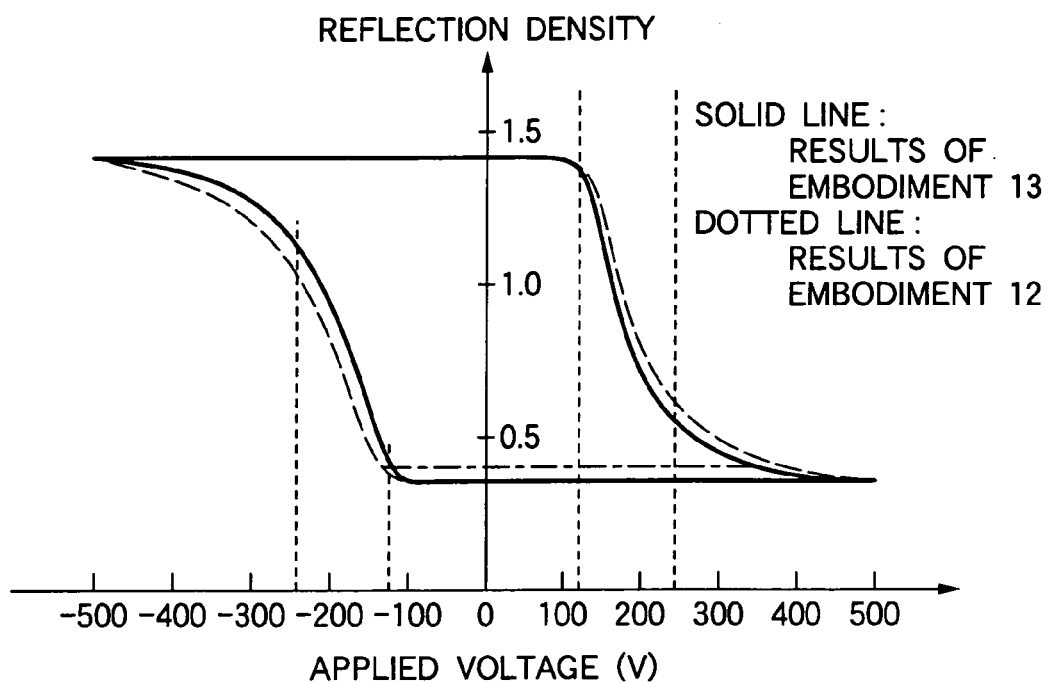
FIG. 24 shows the relationship between applied voltage and reflection density in the method of embodiment 14.

A −500V rectangular wave voltage pulse is then applied to the ITO electrodes of the display substrate of the display medium used in embodiment 1 to set the entire display substrate to black. Next, a positive sawtooth wave voltage pulse is applied to the ITO electrodes of the display substrate for 30 msec. This pulse is applied three times, and the voltage supply is then stopped. Image density on the display substrate is then measured using a densitometer (X-Rite 404A, X-Rite Co.) The above steps are then repeated while gradually increasing the peak voltage of the positive sawtooth wave. Results are shown in FIG. 24. It should be noted that the applied voltage shown in FIG. 24 is the peak voltage of one pulse. The results from embodiment 12 are also shown for reference.

As shown in FIG. 24, it is possible by repeatedly applying the voltage pulse to maintain the particle drive start voltage while achieving a sharper rise in the applied voltage-display density curve. When this method is applied to passive matrix drive, the voltage applied to both substrates at a pixel to be changed for display is approximately +/−240 V, as in embodiment 12, the displayable white density at approximately 240 V is approximately 0.55, and white density can be further lowered compared with embodiment 11.

Furthermore, the displayable black density at approximately −240 V is approximately 1.10 from FIG. 24, and black density can be further improved compared with embodiment 12.

Comparison 2

Using the display medium of embodiment 1 above, a +500V rectangular wave voltage pulse is applied to the ITO electrode of the display substrate to turn the display substrate entirely white. A negative rectangular wave voltage pulse is then applied once to the ITO electrodes of the display substrate. The voltage supply is then stopped and the image density on the display substrate is measured using a densitometer (X-Rite 404A, X-Rite Co.). Next, a +500V rectangular wave voltage pulse is applied to turn the display substrate entirely white. These steps are repeated while changing the negative pulse voltage and the pulse apply time to determine the relationship between apply time and the particle drive start voltage. Results are shown in FIG. 25.

A −500V rectangular wave voltage pulse is then applied to the ITO electrodes of the display substrate of the display medium of embodiment 1 to turn the entire display substrate black. A positive rectangular wave voltage pulse is then applied to the ITO electrodes of the display substrate once. The voltage supply is then stopped and the image density on the display substrate is measured using a densitometer (X-Rite 404A, X-Rite Co.). Next, a −500V rectangular wave voltage pulse is applied to turn the display substrate entirely black. These steps are repeated while changing the positive pulse voltage and the pulse apply time to determine the relationship between apply time and the particle drive start voltage. Results are shown in FIG. 26.

Figure 25:
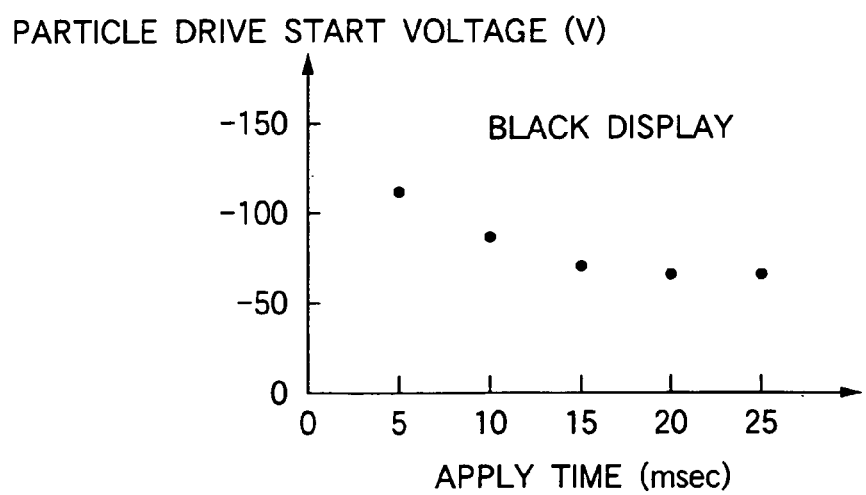
FIG. 25 shows the relationship between particle drive start voltage and voltage pulse apply time when displaying black using the method of comparison 2.
Figure 26:
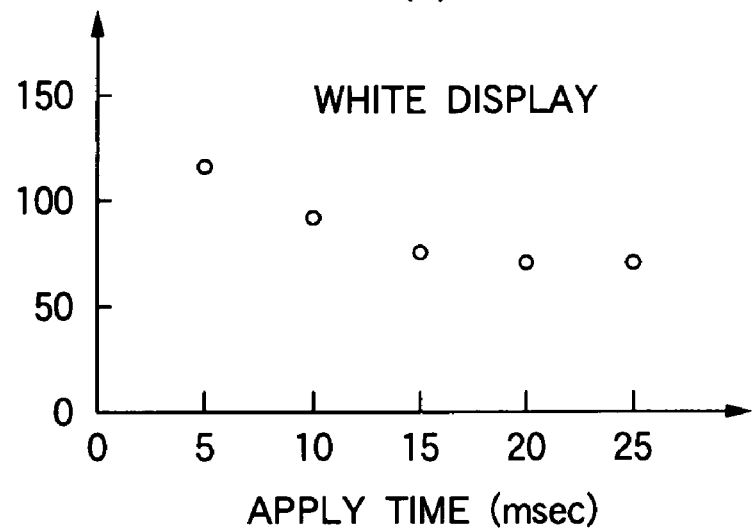
FIG. 26 shows the relationship between particle drive start voltage and voltage pulse apply time when displaying white using the method of comparison 2.

From FIG. 25 and FIG. 26 we know that if the apply time of one pulse is 20 msec or less, the absolute value of the particle drive start voltage increases.

Comparison 3

Using the display medium of embodiment 1 above, a +500V rectangular wave voltage pulse is applied to the ITO electrode of the display substrate to turn the display substrate entirely white. A −200V rectangular wave voltage pulse is then applied once to the ITO electrodes of the display substrate. The voltage supply is then stopped and the image density on the display substrate is measured using a densitometer (X-Rite 404A, X-Rite Co.). Next, a +500V rectangular wave voltage pulse is applied to turn the display substrate entirely white. These steps are repeated while changing the pulse apply time. Results are shown in FIG. 27.

Figure 27:
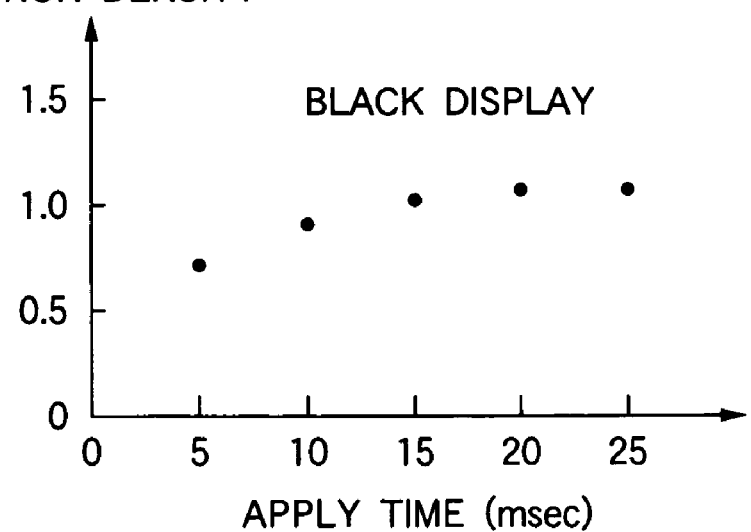
FIG. 27 shows the relationship between reflection density and voltage pulse apply time using the method of comparison 3.

As shown in FIG. 27, image density gradually decreases as the pulse width decreases.

Embodiment 15

Comparison 4

Using the display medium of embodiment 1 above, a +500V rectangular wave voltage pulse is applied to the ITO electrode of the display substrate to turn the display substrate entirely white. A −200V rectangular wave voltage pulse is then applied for 5 msec to the ITO electrodes of the display substrate. The voltage supply is then stopped and the image density on the display substrate is measured using a densitometer (X-Rite 404A, X-Rite Co.). Applying this voltage pulse and density measurement are then repeated. Results are shown in FIG. 28.

Figure 28:
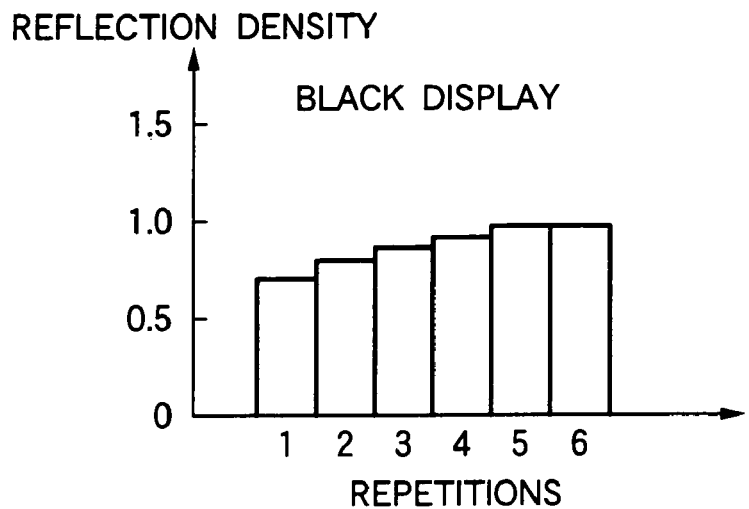
FIG. 28 shows the relationship between applied voltage pulse count and reflection density in the method of embodiment 15.

As shown in FIG. 28, display density gradually increases as the number of repetitions increases, and density is substantially saturated after five pulses are applied. Note, further, that there is substantially no change in the particle drive start voltage as a result of repeatedly applying the voltage pulse.

It should be noted that applying the pulse only once in this example is used as comparison 4.

Embodiment 16

Using the display medium of embodiment 1 above, a +500V rectangular wave voltage pulse is applied to the ITO electrode of the display substrate to turn the display substrate entirely white. A negative rectangular wave voltage pulse is then applied to the ITO electrodes of the display substrate for 5 msec. Applying this voltage pulse is repeated 5 times and then the image density on the display substrate is measured using a densitometer (X-Rite 404A, X-Rite Co.). These steps are then repeated while changing the negative rectangular pulse voltage.

Figure 29:
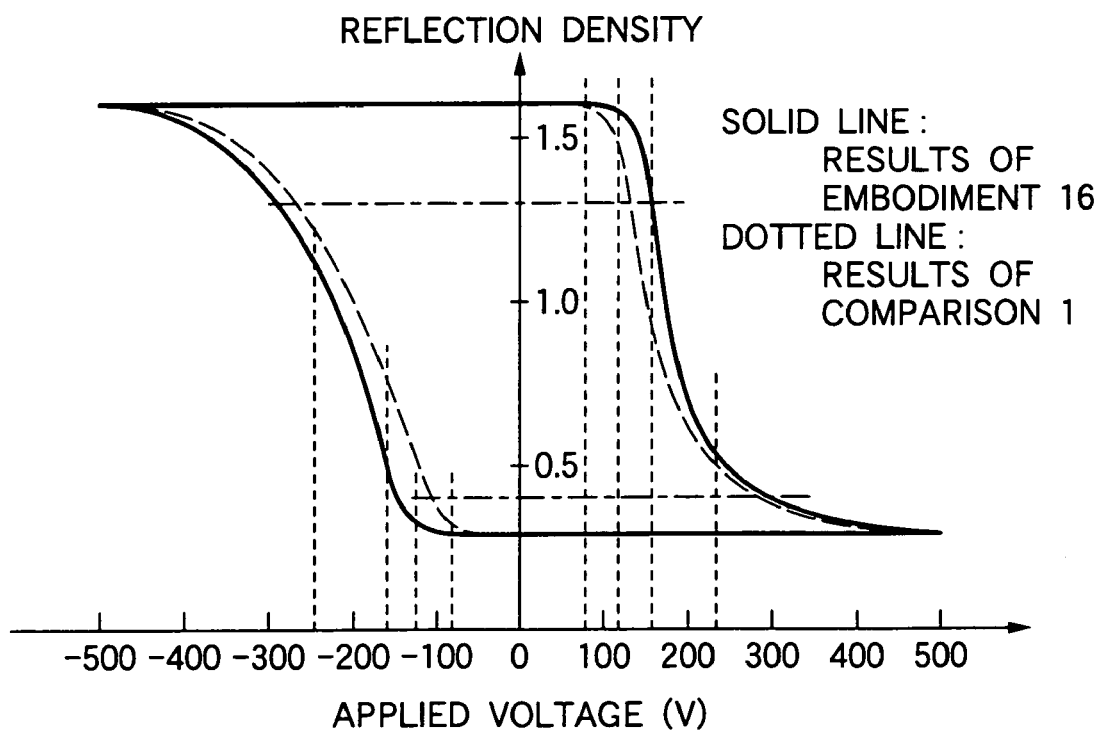
FIG. 29 shows the relationship between applied voltage and reflection density in the method of embodiment 16.
Figure 30:
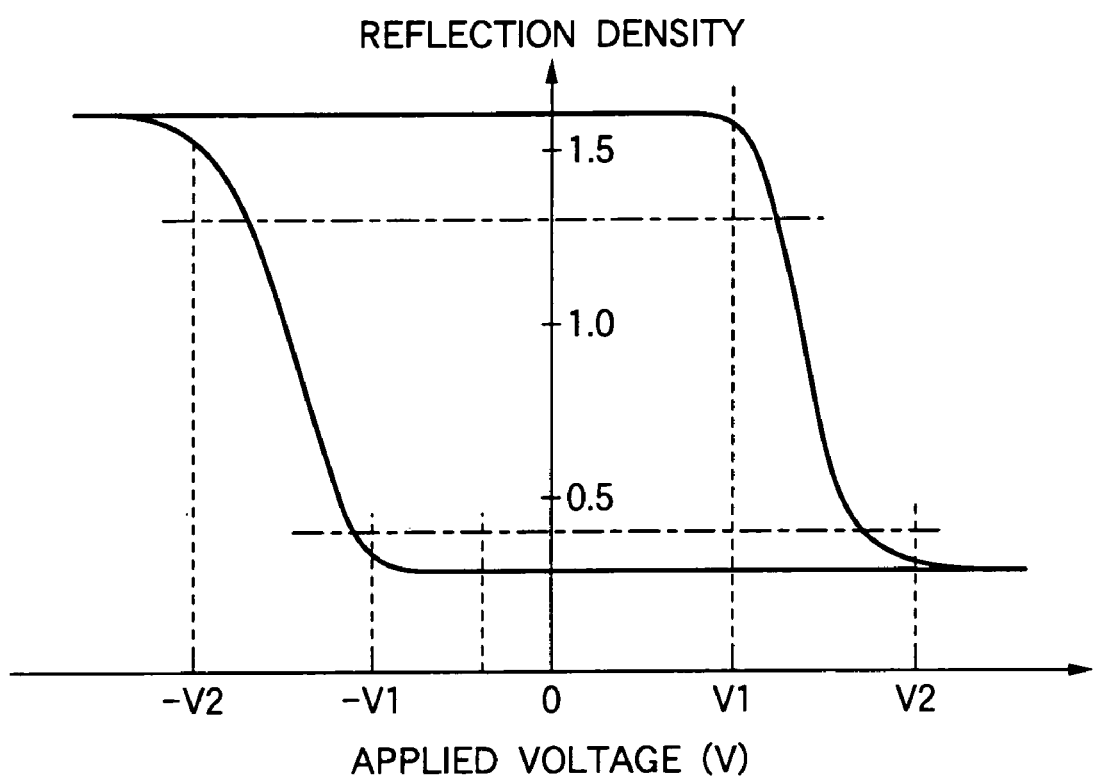
FIG. 30 shows the preferred display characteristics during passive matrix drive.

Using the display medium of embodiment 1 above, a −500V rectangular wave voltage pulse is applied to the ITO electrode of the display substrate to turn the display substrate entirely black. A positive rectangular wave voltage pulse is then applied to the ITO electrodes of the display substrate for 5 msec. Applying this voltage pulse is repeated 5 times and then the image density on the display substrate is measured using a densitometer (X-Rite 404A, X-Rite Co.). These steps are then repeated while changing the positive rectangular pulse voltage. Results are shown in FIG. 29. Note that the results from comparison 1 are also shown in FIG. 29 for reference.

As shown in FIG. 29, the rise in the display density in response to the applied voltage is sharper when compared with comparison 1. In this embodiment the particle drive start voltage applied to change the pixel color from black to white is approximately 120 V, and is approximately −120 V to change from white to black.

Therefore, when this method is applied to passive matrix drive, the voltage applied to both substrates is approximately +/−240 V. The displayable white density at approximately 120 V is approximately 0.50 from FIG. 29. We can therefore conclude that applying the method of this embodiment to passive matrix drive reduces white density when compared with the drive method of comparison 1 applied to passive matrix drive.

Furthermore, the displayable black density at approximately −240 V is approximately 1.10 from FIG. 29. We can therefore also conclude that applying the method of this embodiment to passive matrix drive increases black density when compared with the drive method of comparison 1 applied to passive matrix drive.

A drive method according to a preferred embodiment of the present invention makes it possible to lower the drive voltage needed to achieve a desired image density. It is therefore possible to improve resolution, downsize and lower the cost of the drive circuit, and greatly improve the durability of the display medium.

A drive method according to a further preferred embodiment of this invention can achieve high contrast even when used with passive matrix drive, and can thereby greatly improve display characteristics using passive matrix drive. It is therefore also possible to achieve a practical passive matrix drive system, and thereby greatly reduce drive circuit cost.

A drive method according to a yet further preferred embodiment of this invention can, compared with a conventional drive method, greatly improve display contrast using passive matrix drive, and can thereby contribute greatly to achieving passive matrix drive in a particle display medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

The entire disclosure of Japanese Patent Application No. 2000-273833 filed on Sep. 8, 2000 including specification, claims, drawings and abstract is incorporated herein by reference in its entirety.

What is claimed is:

1. A drive method for displaying an image on a display medium comprising first and second substrates, at least one of which is transparent, disposed with a gap therebetween, and two types of particles sealed between the first and second substrates, each type of particle having different color and charge characteristics than the other type of particle, comprising:

applying a first voltage pulse to at least one of the first and second substrates to urge particles that, according to the image, are to move to the first substrate to move towards the first substrate when changing an image displayed on the medium; and applying a second voltage pulse to urge particles that, according to the image, are to move to the second substrate, opposite to the first substrate, to move towards the second substrate, thereby changing the image displayed on the medium;

wherein the first substrate comprises a first electrode and the second substrate comprises a second electrode, the first and second voltage pulses are applied between the first electrode and the second electrode, and at least the first and second voltage pulses are applied to produce the image, and wherein the display medium is free of liquid.

2. The display medium drive method as described in claim 1, wherein a total voltage pulse apply time in a cycle for applying the first voltage pulse to at least one of the first and second substrates to urge the particles that are to move to the first substrate to move towards the first substrate, and then applying the second voltage pulse to move the particles that are to move to the second substrate to move toward the second substrate, is 0.1 msec to 40 msec.

3. The display medium drive method as described in claim 1, wherein the cycle for applying the first voltage pulse to at least one of the first and second substrates to urge the particles that are to move to the first substrate to move towards the first substrate, and then applying the second voltage pulse to move the particles that are to move to the second substrate to move towards the second substrate, is performed two or more times.

4. A drive method for displaying an image on a display medium comprising a transparent display substrate, a back substrate opposite the display substrate with a gap therebetween, and two types of particles sealed between the display substrate and back substrate, each type of particle having different color and charge characteristics than the other type of particle, comprising:

applying a first voltage pulse to the display substrate and back substrate to move particles adjacent to the back substrate toward the display substrate when changing an image displayed on the medium; and applying a second voltage pulse to move particles, which moved and which are associated with pixels other than the pixels for which particles were intended to move, toward the back substrate;

wherein the first substrate comprises a first electrode and the second substrate comprises a second electrode, the first and second voltage pulses are applied between the first electrode and the second electrode, and at least the first and second voltage pulses are applied to produce the image, and wherein the display medium is free of liquid.

5. The display medium drive method as described in claim 4, wherein a cycle for applying the first voltage pulse to the display substrate and back substrate to move the particles adjacent to the back substrate toward the display substrate, and then applying the second voltage pulse to move the particles, which moved and which are associated with pixels other than pixels for which particles were intended to move, toward the back substrate, is performed two or more times.

6. A drive method for a display medium comprising first and second substrates, at least one of which is transparent, disposed with a gap therebetween, and two types of particles sealed between the first and second substrates, each type of particle having different color and charge characteristics than the other type of particle, comprising:

applying a voltage pulse to at least one of the first and second substrates, the voltage pulse gradually increasing from a start voltage to a peak voltage, wherein the display medium is free of liquid.

7. The display medium drive method as described in claim 6, wherein the voltage pulse is applied two or more times.

8. The display medium drive method as described in claim 6, wherein the first substrate comprises a first electrode, and the second substrate comprises a second electrode.

9. A drive method for displaying an image on a display medium comprising first and second substrates, at least one of which is transparent, disposed with a gap therebetween, and two types of particles sealed between the pair of substrates, each type of particle having different color and charge characteristic than the other type of particle, comprising:

applying a rectangular wave voltage pulse two or more times with a pulse width of 0.1 msec to 20 msec to at least one of the pair of substrates to produce the image, wherein the display medium is free of liquid.

10. The display medium drive method as described in claim 9, wherein the first substrate comprises a first electrode, and the second substrate comprises a second electrode.

* * * * *